United States Patent
Ma et al.

(10) Patent No.: US 7,864,764 B1
(45) Date of Patent: Jan. 4, 2011

(54) ACCELERATED PACKET PROCESSING IN A NETWORK ACCELERATION DEVICE

(75) Inventors: Qingming Ma, Santa Clara, CA (US); Bryan Burns, Portland, OR (US); Xianzhi Li, Santa Clara, CA (US); Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 12/211,371

(22) Filed: Sep. 16, 2008

(51) Int. Cl.
*H04L 12/56* (2006.01)
*H04L 12/28* (2006.01)
*H04L 12/54* (2006.01)

(52) U.S. Cl. ................ 370/389; 370/412; 370/428; 370/401

(58) Field of Classification Search ............ 370/236, 370/237, 389, 392, 401, 412–427, 428–429
See application file for complete search history.

(56) References Cited

U.S. PATENT DOCUMENTS

| | | | | |
|---|---|---|---|---|
| 6,792,507 B2* | 9/2004 | Chiou et al. | ............. | 711/119 |
| 7,116,679 B1* | 10/2006 | Ghahremani | ............. | 370/463 |
| 7,327,757 B2* | 2/2008 | Ghahremani et al. | ........ | 370/466 |
| 2002/0085560 A1* | 7/2002 | Cathey et al. | ............. | 370/392 |
| 2002/0191605 A1* | 12/2002 | Lunteren et al. | ............. | 370/389 |
| 2004/0022254 A1* | 2/2004 | Pathak et al. | ............. | 370/396 |
| 2004/0213275 A1* | 10/2004 | Basso et al. | ............. | 370/411 |
| 2004/0258043 A1* | 12/2004 | Engbersen et al. | .......... | 370/351 |
| 2006/0167975 A1* | 7/2006 | Chan et al. | ............. | 709/203 |
| 2009/0010259 A1* | 1/2009 | Sirotkin | ............. | 370/392 |
| 2009/0147793 A1* | 6/2009 | Hayakawa et al. | .......... | 370/401 |

* cited by examiner

*Primary Examiner*—Warner Wong
(74) *Attorney, Agent, or Firm*—Shumaker & Sieffert, P.A.

(57) ABSTRACT

In general, techniques are described for reducing response times to retrieve content in an intermediate network device. In particular, the intermediate network device receives a packet from a client device of a first network that requests content from a remote network device of a second network, inspects the packet to determine whether the requested content has been previously cached to either of a first and a second memory of the device, issues a request to load the requested content from the second memory to the first memory based on the determination and queues the packet within in the queue. After queuing the packet, the intermediate network device then processes the packet to assemble a response that includes the content from the memory.

49 Claims, 6 Drawing Sheets

ACCELERATED PACKET PROCESSING IN A NETWORK ACCELERATION DEVICE

TECHNICAL FIELD

The invention relates to computer networks and, more particularly, to network acceleration devices used within computer networks.

BACKGROUND

In a typical network environment, client devices request and download content stored within network servers. Exemplary content includes web pages that may contain one or more of text, graphics, video, and sound data. Other examples of content include files, multimedia data streams (e.g., audio or video data streams), electronic messages, and data tables. Upon receiving the content requests, the network servers typically retrieve the requested content, break the requested content into packets, and transmit the packets to the requesting client device. Routers and other network infrastructure direct these packets through the network to the client devices, which, in turn, reconstruct the content from the packets and present the content to users via applications residing on the client devices.

The network may experience a variety of issues that result in decreased download speeds at the client devices. These issues include a large volume of content requests to a single network server that overload or otherwise diminish the capacity of the network server to timely service the requested content. Moreover, network congestion and limited network bandwidth may impact client download speeds. To increase download speeds, the network may employ one or more intermediate network acceleration devices located between the client devices and the servers to address the above listed issues or other issues that adversely affect download speeds.

As one example, a network acceleration device may cache content received in response to a first request from a client device requesting the content. The network acceleration device may then receive and process subsequent requests for that same content by providing the cached content to the requesting client devices, thereby possibly eliminating additional requests for and the time associated with accessing the content from the remote servers. In this manner, a network acceleration device may be employed to facilitate transactions between the client and network server to increase the overall efficiency of downloading content. Commonly, this efficiency is measured in terms of a response time, e.g., the time necessary to transmit a response to the content request. In many instances, caching content may decrease response times.

SUMMARY

In general, the invention is directed to techniques for accelerating packet processing within a network acceleration device. For example, the techniques reduce response times in retrieving content cached by the network acceleration device. The techniques may enable a network acceleration device to reduce response times when retrieving cached content from a storage device, such as a disk or large memory with slower access times. Upon interception of a packet requesting content, the network acceleration device may, pre-process the received packet (referred to herein as "classification") by inspecting specific portions of the packet's payload so as to determine whether content requested by the packet is currently cached by the network device. If so, the network acceleration initiates the retrieval of the requested content from the storage device for loading into a high-speed memory for subsequent use in responding to the packet. The classification process may occur prior to internally queuing the packet for later processing by the network acceleration device. While the packet is queued and pending full processing, hardware components of the intermediate network device completes the transfer the requested content from the storage device acting as the device's internal cache to the higher speed memory such that upon retrieving the packet from the queue for the later processing, the requested content is ready and waiting in the memory. The intermediate network device may then process the packet more efficiently by immediately retrieving the content from the memory upon the dequeuing of the packet for processing.

For example, an intermediate network device, such as a client-side wide area network (WAN) acceleration (X) device, may implement the techniques described herein to efficiently retrieve cached content to reduce response times to intercepted content requests. The intermediate network device may receive a packet from a client device of a first network that requests content from a remote network device of a second network. The remote network device of the second network may, for example, comprise a network server or database of a public network or a data center of campus network. Upon receiving the request packet, a classifier module of the intermediate network device may quickly inspect only specific portions of the packet to determine whether the requested content has been previously cached to either of the first high-speed local memory or the typically mechanical, local disk drive or other mass storage device or component. Based on this determination, the classifier module may issue a request to initiate the process of loading the requested content from the mass storage device to the first memory where the content can subsequently be quickly accessed for assembling a response to the intercepted content request.

After initiating the transfer, the classifier module of the intermediate network device may next store the packet within an input queue of the intermediate network device. A packet processing module of the intermediate network device may process the packet by (i) retrieving the packet from the queue, (ii) generating a response that includes the requested content now loaded into the memory and (iii) forwarding the response to the client device. In this manner, intermediate network device may more efficiently retrieve content from the slower second local storage device, e.g., the mechanical hard drive, to decrease response times.

In other words, instead of issuing the request to retrieve the content from the slower, typically mechanical, storage device with the packet processing module, the classifier module of the intermediate network device, in accordance with the techniques described in this disclosure, issues this request based on limited, efficient pre-processing of the packet. By issuing the request prior to placing the packet in the input queue, the content may be transferred from the slower mass storage device to the high-speed, memory, while the packet is queued for subsequent complete processing. As a result of the retrieval of the requested content and the packet queuing occurring in parallel, instead of sequentially or in series as would occur in conventional network accelerators, the intermediate network device may reduce response times through more efficient retrieval of the cached content.

In one embodiment, a method comprises receiving a packet with an intermediate network device from a client device of a first network that requests content from a remote network device of a second network and inspecting, with a classifier module of the intermediate network device, the packet to determine whether the requested content has been previously cached to either of a first and a second memory of the intermediate network device. The method further comprises issuing, with the classifier module, a request to begin retrieving and loading the requested content from the second memory to the first memory based on the determination, and storing, with the classifier module, the packet in a queue of the intermediate network device. The method also comprises processing the packet with a packet processing module of the intermediate network device by (i) retrieving the packet from the queue, (ii) retrieving the requested content from the first memory, (iii) generating a response that includes the requested content retrieved from the first memory and (iv) forwarding the response to the client device that requested the content.

In another embodiment, an intermediate network device comprises a first memory for caching a first plurality of cached data objects, a second memory for caching a second plurality of cached data objects and a queue. The intermediate network device further comprises a classifier module that receives a packet from a client device of a first network that requests content from a remote network device of a second network, inspects the packet to determine whether the requested content has been previously cached to either of the first and the second memory, issues a request to load the requested content from the second memory to the first memory based on the determination and stores the packet in the queue. The intermediate network device further comprises a packet processing module that processes the packet by (i) retrieving the packet from the queue, (ii) retrieving the requested content from the first memory, (iii) generating a response that includes the requested content retrieved from the first memory and (iv) forwarding the response to the client device that requested the content.

In another embodiment, a network system comprises a first network that includes an intermediate network device and at least one client device, and a second network located remote from the first network and includes a remote network device. The intermediate network device comprises a first memory for caching a first plurality of cached data objects, a second memory for caching a second plurality of cached data objects, and a queue. The intermediate network device also comprises a classifier module that receives a packet from the at least one client device that requests content from the remote network device, inspects the packet to determine whether the requested content has been previously cached to either of the first and the second memory, issues a request to load the requested content from the second memory to the first memory based on the determination and stores the packet in the queue. The intermediate network device further comprises a packet processing module that processes the packet by (i) retrieving the packet from the queue, (ii) retrieving the requested content from the first memory, (iii) generating a response that includes the requested content retrieved from the first memory and (iv) forwarding the response to the client device that requested the content.

In another embodiment, a computer-readable medium comprises instructions that cause a programmable processor to receive a packet with an intermediate network device from a client device of a first network that requests content from a remote network device of a second network and inspect, with a classifier module of the intermediate network device, the packet to determine whether the requested content has been previously cached to either of a first and a second memory of the intermediate network device. The instructions further cause the programmable processor to issue, with the classifier module, a request to begin retrieving and loading the requested content from the second memory to the first memory based on the determination, and store, with the classifier module, the packet in a queue of the intermediate network device. The instructions also cause the programmable processor to process the packet with a packet processing module of the intermediate network device by (i) retrieving the packet from the queue, (ii) retrieving the requested content from the first memory, (iii) generating a response that includes the requested content retrieved from the first memory and (iv) forwarding the response to the client device that requested the content.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
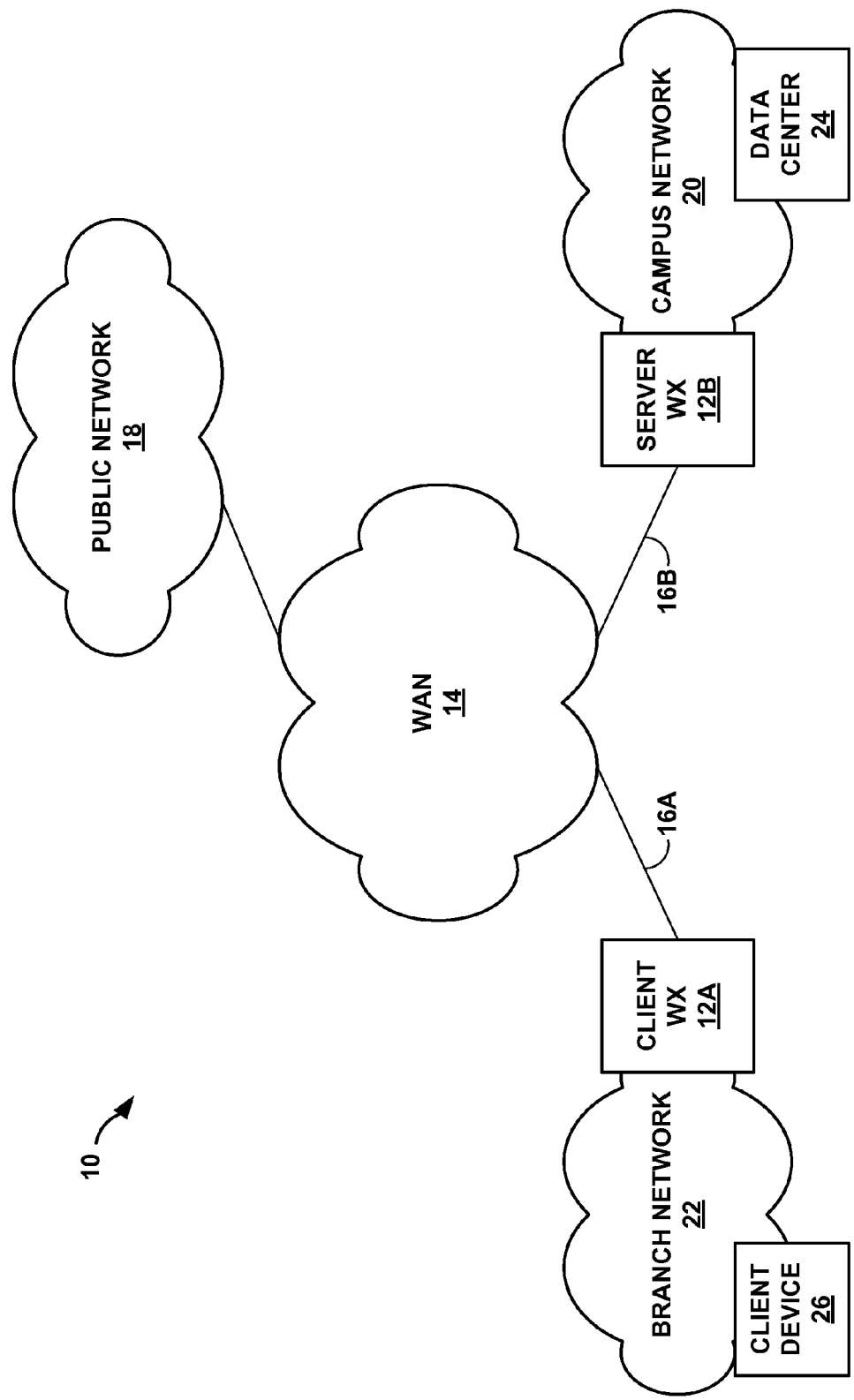
FIG. 1 is a block diagram illustrating an exemplary network environment in which a client wide area network acceleration (WX) device efficiently retrieves cached content to reduce response times in accordance with the techniques of the invention.

FIG. 1 is a block diagram illustrating an exemplary network environment 10 in which a client wide area network acceleration device 12A efficiently retrieves cached content to reduce response times in accordance with the techniques of the invention. While described in this disclosure with respect to a client Wide Area Network (WAN) acceleration (X) device 12A ("client WX 12A"), the techniques may be implemented by any network device that caches content or otherwise performs network acceleration through local storage of requested content. Moreover, although shown in FIG. 1 as a separate, stand-alone or independent device, client WX 12A may be incorporated within any other network device, including a router, a switch, a hub, a firewall, and an intrusion detection/prevention (IDP) device. The techniques therefore should not be limited to a client WX but may be implemented by any network device.

As shown in FIG. 1, client WX 12A couples to a Wide Area Network 14 ("WAN 14") via a link 16A. WAN 14 may comprise a public or private network that is available for lease or purchase by private entities or businesses so as to couple remote locations and/or networks together. WAN 14 may provide access to a public network 18, which may include any publicly accessible network, such as the Internet. Public network 18 typically comprises a packet-based network that transmits packets according to an Internet Protocol (IP)/Transmission Control Protocol (TCP). WAN 14 may also provide access to a campus network 20 via a link 16B.

Client WX 12A resides at the edge of a remote or branch network 22. Likewise, a server WAN acceleration device 12B ("server WX 12B") resides at the edge of campus network 20. Branch network 22 may represent a small network used by a remote location or office of a large enterprise or business. Branch network 22 may comprises a local area network (LAN) that operates according to one of the family of Institute of Electrical and Electronics Engineers (IEEE) 802.X Ethernet standards. Campus network 20 may represent a larger network used by the main office or location of the large enterprise or business. Campus network 20 may also comprise a LAN that operates according to one of the family of IEEE 802.X Ethernet standards. Typically, data and other resources, such as templates, documents, manuals, accounting figures, employee information, applications, and any other information or application pertinent to operation of both the remote and main offices of the large enterprise, are stored in a centralized location.

Campus network 20 includes a data center 24, which may provide such a centralized location for the storage of the above described data, applications, and other resources. That is, data center 24 may include one or more data servers, web servers, application servers, databases, computer clusters, mainframe computers, and any other type of server, computing element, and/or database commonly employed by an enterprise or business to facilitate the operation of the enterprise or business. These servers and/or databases may comprise "blades" or other cards that are inserted into large racks. The racks may provide a common backplane or switch fabric to interconnect the various servers and/or databases to one another, as well as, to campus network 20.

By connecting to campus network 20, data center 22 may be accessible by any devices included within campus network 20 and any devices, e.g., a client device 26, of branch network 22. Client device 26 may comprise a laptop computer, a desktop computer, a workstation, a mainframe computer, a personal digital assistant (PDA), a cellular phone, a smart phone, or any other device capable of accessing a network. Campus network 20 may provide such a centralized location for the storage of data, applications, or other computing resources to reduce costs associated with distributed data storage.

Distributed data storage architectures typically required each location to maintain its own separate database or server for use in storing data pertinent to each respective location. For example, assuming, for purposes of illustration, that campus and branch networks 20 and 22 implemented distributed data storage, branch network 22 may also have included a remote data center for storing data and other resources pertinent to the operation of the branch office. In this distributed data storage example, data center 24 would usually only store data and other resources pertinent to the operation of campus network 20. As network infrastructure lies in both of networks 20 and 22, the enterprise or business may be required to have dedicated Information Technology (IT) staff at both the remote location, e.g., the branch office, and the main location, e.g., the main office, to service both the remote and central data centers, which may increase expenses. Even if no dedicated IT staff is provided for servicing the remote data center, the enterprise may be required to send IT staff to the remote location, e.g., branch office 22, to service the remote data center, which may increase costs and otherwise impinge upon the operation of the branch office. Moreover, issues, e.g., data loss, may arise when the data and other resource need to be synchronized with data center 24 of the main office or campus.

Centralized storage of data and other resources, however, reduces, if not eliminates many of these issues by placing all of the equipment necessary for data storage within a centralized location that is easily accessible by a dedicated and centrally located IT staff. Furthermore, as a result of next generation Internet services and web development, centrally located data center 24 may serve web-based applications that enable remote users to access data and other resources stored to data center 24 through a simple web-browser executed by client device 26. Because only a simple web-browser is required, branch offices may no longer require dedicated IT staff on site. Moreover, because applications and other data may be deployed remotely, the IT staff need not travel to the remote office. Again, by virtue of centralizing the data and other resources, IT costs may be significantly reduced. As a result, centralized data centers, such as data center 24, are setting the standard by which large enterprises or businesses store and maintain data, as well as, remotely distribute new and update old applications.

While centralized storage of the data and other resources may decrease costs, this centralized architecture typically requires that branch network 22 maintain access to campus network 20. Commonly, large enterprises or businesses may lease or purchase a dedicated line or connection that couples branch network 22 and campus network 20 together to ensure privacy or otherwise prevent unauthorized access to networks 20 and 22. A network service provider may lease or sell this line to the enterprise or business and usually charges various prices depending on the speed and/or bandwidth of the line. For example, a service provider may offer for lease a digital signal 1 ("DS1") or T-carrier 1 ("T1") line (e.g., a dedicated line having 1.536 mega-bits per second of bandwidth) for a first price per month and a DS3 or T3 line (e.g., a dedicated line having 44.736 mega-bits per second of bandwidth) for a second higher price per month. Depending on the bandwidth required between branch network 22 and campus network 20, the enterprise or business may choose either to purchase the T1 or T3 line.

For purposes of illustration, it is assumed that links 16 are leased or purchased from one or more network service providers of WAN 14. Notably, the term "link" may used herein to refer to the physical connection (such as the cables or other communications mediums running between one or more central offices of WAN 14 and networks 20, 22), while "line" refers to a service (such as a T1 line or T3 line) carried by the link. Often, however, the terms are used interchangeably as a T1 or T3 line generally accompanies the leasing of one or more links. That is, a customer may request a T1 line service and, as part of that service, the service provider leases a dedicated link to the customer as part of providing the T1 line service. As a result, links 16 may also be referred to herein as "lines 16."

Considering that bandwidth concerns may, in part, control the selection of lines, the business or enterprise may attempt to reduce the bandwidth required between branch network 22 and campus network 20 in order to, again, reduce costs by enabling the enterprise to subscribe to a line that provides (and lease a link capable of supporting) less bandwidth. To this end, branch network 22 and campus network 20 may include respective intermediate network devices, e.g., client WX 12A and server WX 12B, to reduce bandwidth consumption. These intermediate network devices, e.g., client WX 12A and server WX 12B, may, for example, communicate with one another so as to compress traffic, and thereby reduce bandwidth consumption, by replacing identified sequences of data with, for example, symbols, where the symbols represent the respective identified sequences using less bits.

Client WX 12A may also locally cache content previously requested by a client device, such as client device 26, in order to reduce if not eliminate bandwidth consumption directed to subsequent requests for the same data. That is, client WX 12A may, instead of issuing the request for the same content previously requested and thereby consuming bandwidth, cache the previously requested content and, without sending the request to data center 22 or public network 18, service the request using the locally cached content, thereby preserving bandwidth.

To cache content, client WX 12A may include a high-speed memory, such as an internal cache, a random access memory (RAM), a dynamic RAM (DRAM), a static RAM (SRAM), or any other memory that provides access to stored data at speeds faster than that of mechanical memories, e.g., hard drives, optical drives, disk drives, etc. Mechanical memories comprise memories that typically require mechanical or moving parts which may increase retrieval and storage times as the various mechanical parts typically must be moved or manipulated in order to access data.

For example, one type of mechanical storage device, e.g., a hard drive, may have to spin a plurality of magnetic platters and move or adjust a location of a read/write head in order to access data stored to the platters. Likewise, another type of mechanical storage device, e.g., a writable compact disk (CD), may require that a CD reader spin the CD and move an optical laser into place prior to reading data stored to the CD. In both instances, mechanical movement is required prior to accessing the data, which may decrease access times and result in a bottleneck, especially if several accesses are requested at the same time as only one access may be serviced by a mechanical storage device at any one time.

Despite the slow data retrieval and storage speeds, client WX 12A may include a mechanical storage device, such as a mass storage device, capable of storing much more data than the high-speed memory. That is, client WX 12A may include the high-speed memory, which usually involves no mechanical parts and may retrieve and store content at a significantly faster rate than mechanical memories, in order to cache a certain amount of content. However, high-speed memory typically commands a higher price, provides less storage capacity and provides persistence of data when compared to mechanical storage devices in terms of cost per unit of storage capacity, such as megabytes (MBs). In order to reduce the cost of client WX 12A, client WX 12A may not provide enough high-speed memory to cache all of the frequently accessed content. Instead, client WX 12A may include one or more mechanical memories, e.g., hard drives, to act as a mass storage device to persistently store data. Client WX 12A may implement various algorithms for managing the storage and transfer of content between the high-speed memory and the mechanical storage device.

While described herein with respect to high-speed memory and mechanical storage device, the techniques may apply generally to any instance where content is cached to a first storage medium that provides relatively faster access times, e.g., read and write times, and transferred to and from the first storage medium to a second storage medium that provides relatively slower access times when compared to the first storage medium. The techniques should not, therefore, be limited to any particular types of memory or storage device. Instead, the techniques may be implemented, for example, to improve the retrieval of content between a first slower memory, such as a level-2 cache, and a second fast memory, such as a level-1 cache.

One such algorithm may move content from the high-speed memory to the mechanical storage device based on the last time the content stored to the high-speed memory was accessed. If accessed an amount of time greater than a threshold, for example, client WX 12A may transfer the content from the high-speed memory to the mechanical storage device. Upon receiving another request for this content, client WX 12A may then load the content from the mechanical storage device to the high-speed memory. In this way, the mechanical storage device may provide an overall cache for storing content previously requested by clients, where the high-speed memory may provide client WX 12A with an internal data cache to temporarily hold recently requested content.

In accordance with the techniques described in this disclosure, client WX 12A, i.e., an intermediate network device, efficiently retrieves cached content to reduce response times required to retrieve the cached content in order to assemble responses and provide the cached content to client device 26. Typically, time to process a request for content is measured from a time client WX 12A receives a request to a time client WX 12A forwards a response to that request. This time is often referred to as a "response time." For example, client WX 12A may receive a packet from a client device 26 of a first network, e.g., branch network 22, that requests content from a remote network device of a second network. The remote network device of the second network may comprise a network server or database (neither shown in FIG. 1) of public network 18 or data center 24 of campus network 20. Upon receiving the request packet, a classifier module of client WX 12A may inspect only specific portion's of the packet so as to quickly determine whether the requested content has been previously cached to either of a high-speed local memory and a slower, typically mechanical, mass storage device included within client WX 12A. Based on this determination, the classifier module may issue a request to begin the process of retrieving and loading the requested content from its mass storage device to the device's high-speed memory.

After issuing this request, the classifier module of client WX 12A may next store the packet within a pre-processing or input queue of client WX 12A. A packet processing module of client WX 12A may process the packet by (i) retrieving the packet form the queue, (ii) generating a response that includes the requested content loaded into the memory and (iii) forwarding the response to client device 26. In this manner, client WX 12A may more efficiently retrieve content from the slower second local storage device, e.g., the mechanical mass storage device, to decrease response times.

In other words, instead of issuing the request to retrieve the content from the slower second, typically mechanical, storage device with the packet processing module, the classifier module of client WX 12A, in accordance with the techniques described in this disclosure, issues this request. By issuing the request prior to placing the packet in the queue, the content may be transferred from the slower storage device to the high-speed memory, while the packet is queuing. As a result of the retrieval of the content and the packet queuing occurring in parallel, instead of sequentially or in series as would occur in conventional network accelerators, client WX 12A may reduce response times through more efficient retrieval of the cached content.

This form of data retrieval may be termed "pre-fetching," however use of this term should not be confused with the use in microprocessors or other processing elements, where data or instructions are "pre-fetched" and loaded into registers prior to executing an instruction that utilizes those registers. In this instance, pre-fetching as the term is used herein refers to retrieving application-layer content (that has been previously requested by a client device and retrieved from a source external to the intermediate network acceleration device) that is cached to a relatively slower memory or mass storage device internal to the intermediate network device, and loading that application-layer content into a relatively faster memory, again, internal to the intermediate network acceleration device, prior to queuing and fully processing, e.g., servicing and responding to, a packet that requests this application-layer content. Whether the content is "cached" within the intermediate network device may refer to whether the content has been previously request by a client device and retrieved from a source external to the intermediate network device. Content may only be cached therefore in response to receiving a request, and as a result, the intermediate network device may maintain a list or other data structure identifying content that is cached, e.g., has been previously requested by, retrieved by, and stored within the intermediate network device.

"Pre-fetching" should also not be confused with a network caching device that automatically issues a request for content to a web server prior to performing any processing to determine whether the content is cached within the network caching device. As used in this disclosure, "pre-fetching" refers to performing some, often light-inspection to determine whether the content has been cached internally to the device rather than issuing some request without performing any inspection. Thus, the classifier module, in this instance, may perform a light inspection of only certain application-layer commands or fields within the payload of the packet in order to ascertain what application-layer data needs to be "pre-fetched;" such inspection does not entail detailed or in-depth processing of the packet's complete payload. Typically, the inspection performed by the classifier module occurs only to the extent necessary to classify the packet or series of packets as corresponding to a particular flow and type of network application (e.g., HTTP) and to determine whether the requested application-layer content is stored locally within client WX 12A so that the pre-fetch request can be sent to a memory subsystem while the packet is being queued for full processing.

While described above with respect to client WX 12A, this two-stage packet-processing techniques may be implemented by any intermediate network acceleration device, including server WX 12B. That is, server WX 12B may efficiently retrieve content in a manner substantially similar to that described above with respect to client WX 12A in order to reduce the consumption of bandwidth. For example, server WX 12B may implement these techniques to efficiently retrieve cached Internet content that may have been previously retrieved from public network 18. The techniques therefore may apply to any network device that caches content so as to reduce the consumption of bandwidth.

Figure 2:
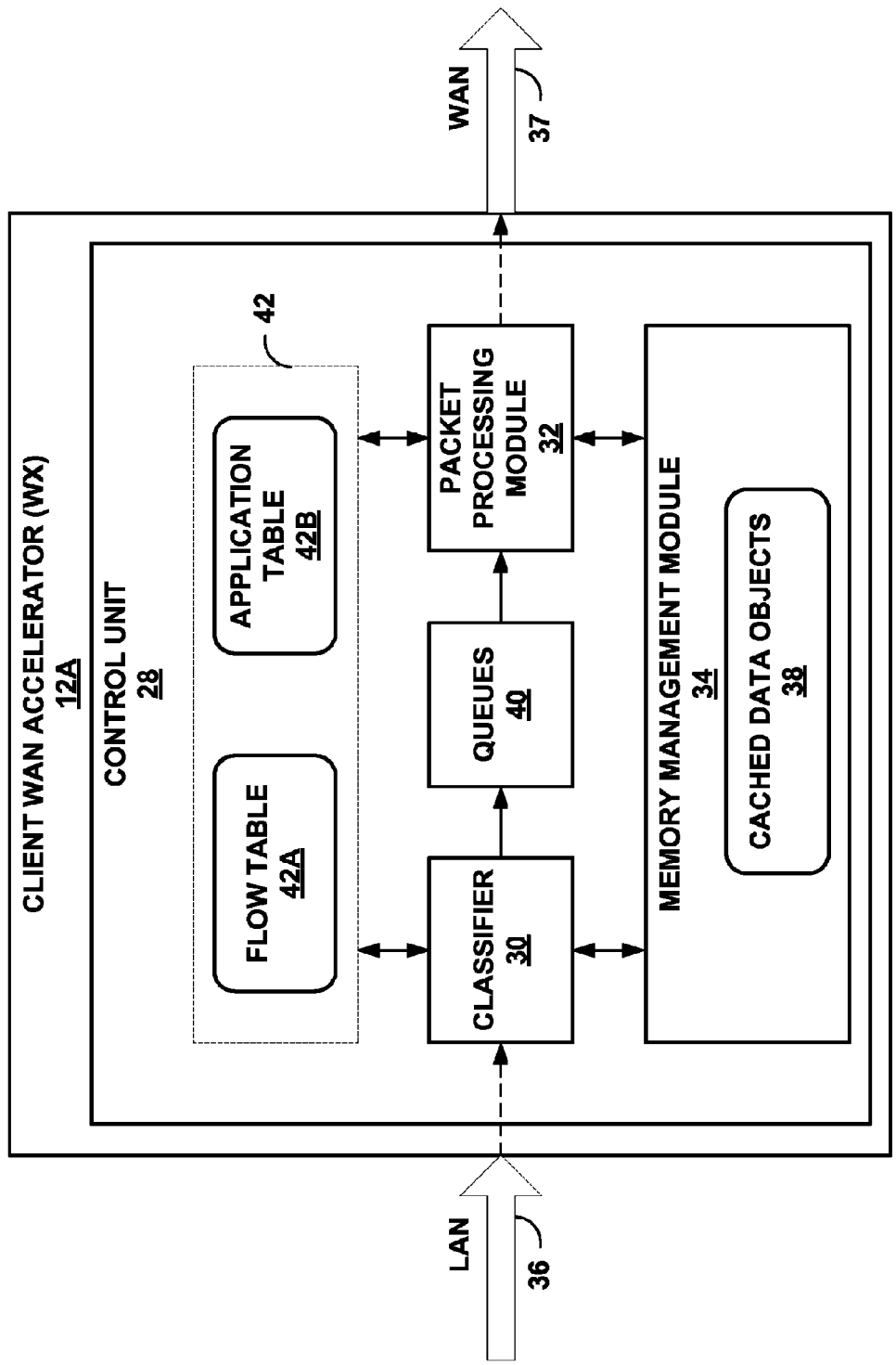
FIG. 2 is a block diagram illustrating the client WX of FIG. 1 in more detail.

FIG. 2 is a block diagram illustrating client WX 12A of FIG. 1 in more detail. That is, client WX 12A is depicted in FIG. 2 in terms of the logical interaction between various components, elements or modules without regard for the underlying hardware. Architectural or physical representations of client WX 12A are described below with respect to FIGS. 3 and 6.

As shown in FIG. 2, client WX 12A includes a control unit 28. Control unit 28 may include one or more processors (not shown in FIG. 2) that execute software instructions stored to a computer-readable storage medium (not shown in FIG. 2), such as a disk drive, optical drive, Flash memory or any other type of volatile or non-volatile memory, that cause a programmable processor, such as control unit 28, to perform the techniques described herein. Alternatively, each of control units 28 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 28 may include a classifier module 30 ("classifier 30"), a packet processing module 32, and a memory management module 34. Classifier 30 represents a module comprising hardware and/or software to receive packets from a network, such as branch network 22, and classify those packets based on information contained within a header, a payload, or both the header and the payload of the packet. As described above, branch network 22 may represent a local area network (LAN) and, in this instance, classifier 30 may receive LAN packets 36 from this LAN network and classify each of LAN packets 36. Classifier 30 may determine, based on this information, a particular flow and application to which each of LAN packets 36 belongs.

Classifier 30 may determine, based on the information, to which flow the particular one of LAN packets 36 corresponds by extracting information referred to as a "five-tuple." Each flow represents a flow of packets in one direction within the network traffic. A five-tuple comprises a source Internet Protocol (IP) address, a destination IP address, a source port, a destination port, and a protocol. Typically, the five-tuple is found within the header of each of LAN packets 36 and classifier 30 may parse or otherwise extract the five-tuple from the header of each of LAN packets 36 to identify to which flow each of LAN packets 36 corresponds. Classifier 30 may also extract and utilize additional information to identify a flow, such as source media access control ("MAC") address and destination MAC address.

Classifier 30 may also, based on this information identify an application-specific protocol or application to which each of LAN packets 36 corresponds. Classifier 30 may, for example, determine, based on a source port of the five-tuple, whether each of packets 36 corresponds to an HTTP application, e.g., a web browser. Typically, classifier 30 performs an initial, often light, amount of processing to classify (e.g., identify a corresponding flow and application for) each of LAN packets 36. As described below in more detail, classifier 30 may also issue a request to memory management module 34 to cause memory management module 34 to move content requested by LAN packets 36 from a local storage device to a memory (both of which are not shown in FIG. 2 for ease of illustration purposes) of client WX 12A.

Packet processing module 32 represents a module comprising hardware and/or software for fully processing LAN packets 36. Processing, in the context of client WX 12A, refers to servicing LAN packets 36 by responding to each of LAN packets 36 with an appropriate response. For example, one of LAN packets 36 may request content from public network 18, and packet processing module 32 processes this packet by retrieving this content from the storage device or the memory local to client WX 12A or directly from public network 18 and responding to the packet with the retrieved content. In some instances, processing of a packet may also refer to packet processing module 32 compressing the packet such that the compressed version of the packet may be sent to server WX 12B to reduce the consumption of bandwidth over links 16 and WAN 14. FIG. 2 illustrates the transmission of packets from packet processing module 32 to WAN 14 as WAN packets 37 ("WAN 37").

Memory management module 34 represents a module comprising hardware and/or software that is responsible for managing a storage device and a memory described above. That is, memory management module 34 may store and retrieve cached data objects 38 to and from either the first-level memories (e.g., high-speed RAM or multi-tiered data caches) or mass storage devices such as disk drives. In addition, memory management module 34 may implement one or more algorithms, such as the above described algorithm, to manage the transfer of cached data object 38 between the various components of the memory subsystem.

Control unit 28 also includes one or more queues 40 ("queues 40" in FIG. 1), a flow table 42A and an application table 42B. Queues 40 may represent a single queue 40 or a plurality of queues 40. If only a single queue 40, queue 40 may store packets, e.g., LAN packets 36, of varying classifications. In instances of a plurality of queues 40, each of the plurality of queues 40 may comprise a queue for storing packets, e.g., LAN packets 36, of the same classification, same flow, and/or any other identifiable characteristic (e.g., same level of service).

Flow and application tables 42A, 42B ("tables 42") represent an exemplary data structure, e.g., a table, for storing information or data pertaining to flows and applications, respectively. Although shown as tables 42, the data may be stored to any other data structure, such as a graph, a linked-list, a single dimensional array (as opposed to a two dimensional array or table), etc. While shown as separated data structures, e.g., tables 42A, 42B, these tables 42 may be combined into a single data structure or three or more data structures, and the invention should not be limited to the exemplary embodiment depicted in FIG. 2.

Flow table 42A may store data describing each flow previously identified by classifier 30, e.g., the five-tuple and other information pertinent to each flow. That is, flow table 42A may specify network elements associated with each active packet flow, e.g., source and destination devices and ports associated with the packet flow. In addition, flow table 42A may identify pairs of packet flows that collectively form a single communication session between a client, e.g., client device 26, and server, e.g., a server of data center 24 or public network 18. For example, flow table 42B may designate communication session as pairs of packet flows in opposite directions for flows sharing at least some common network addresses, ports and protocol. Flow table 42A may also include a unique application identifier (ID) for each flow that uniquely identifies the application to which each flow corresponds.

Application table 42B may store application information pertaining to the state of each application currently active in the network. This application state may identify whether requested content is stored locally within either of the first and second local memories of client WX 12A. The application state may even identify to which of the first and second local memories particular content is stored. Application table 42B may be indexed according to application IDs, where classifier 30 may utilize the application ID determined after accessing flow tables 42A to access an application state corresponding to the application uniquely identified by the application ID.

In accordance with the techniques described herein, classifier 30 may receive LAN packets 36 from one or more client devices, e.g., client device 26 of FIG. 1. In some embodiments, control unit 28 includes an input buffer (not shown in FIG. 2) to buffer incoming LAN packets 36. Thus, classifier 30 may not directly receive LAN packets 36, but instead may retrieve these packets 36 from the input buffer. FIG. 2 illustrates this indirect receipt of packets 36 with a dashed line from LAN packets 36 to classifier 30.

Upon receiving LAN packets 36, classifier 30 may parse or otherwise extract information from each of LAN packets 36. Based on this information, classifier 30 may classify each of LAN packets 36. That is, classifier 30 may parse the above described five-tuple from a header of each of LAN packets 36. Using this extracted five-tuple, classifier 30 may look-up a flow identified by the five-tuple in flow table 42A.

If the flow identified by the extracted five-tuple does not exist within flow table 42A, classifier 30 may add the flow identified by the five-tuple to flow table 42A and associate the newly added flow with a level of service. Classifier 30 may then parse or otherwise extract information from the header, a payload or both the header and the payload of each of LAN packets 36 and, using this information, determine an application to which each of these packets 36 correspond. Classifier 30 may inspect the above information extracted from each of LAN packets 36 for information that uniquely identifies a particular application.

For example, a number of destination port numbers are statically associated with or bound to certain applications. The following table 1 presents many of these static associations or bindings.

TABLE I

| PORT | APPLICATION |
|---|---|
| 20 | FTP |
| 22 | SSH |
| 23 | Telnet |
| 25 | SMTP |
| 43 | WHOIS |
| 53 | DNS |
| 67 | BOOTP or DHCP |
| 70 | Gopher |
| 79 | Finger |
| 80 | HTTP |
| 109 | POP |
| 110 | POP3 |
| 113 | ident/IRC |
| 118 | SQL |
| 119 | NNTP |
| 194 | IRC |
| 443 | HTTPS |
| 445 | SMB |
| 564 | RTSP |

Classifier 30 may utilize these static associations to determine a particular application to which each of packets 36 corresponds. To illustrate, table 1 provides that Hyper Text Transfer Protocol (HTTP) applications have adopted a port number of 80 as the standard port number by which clients, e.g., client device 26, may connect to web servers and request content. Classifier 30 may therefore extract a destination port from each of packets 36 and determine that each of packets 36 having a destination port of 80 correspond to a HTTP or web browsing application. Classifier 30 may maintain table I above as a configurable table and perform a look-up in this table using a destination port of 80 as a key to identify an application identifier (ID) that uniquely identifies the corresponding HTTP or web browsing application.

Classifier 30 may also employ a number of other techniques to identify an application based on the information included within each of LAN packets 36. Some of these techniques may involve classifier 30 invoking or executing one or more application-specific modules that extract data from the header, the payload, or both the header and the payload of an unidentified packet 36. Based on this information, the one or more application-specific modules may determine whether the one of packets 36 corresponds to a particular application. Thus, these application-specific modules may enable classifier 30 to determine an application and corresponding application ID for those applications that utilize non-static port numbers or employ so-called "port-hopping" protocols.

After determining the application ID, classifier 30, next, updates the newly added flow entry in flow table 42A with the application ID. However, if the identified flow exists, an entry in flow table 42A, classifier 30 may update flow table 42A to reflect changes to the flow or associate the flow with other flows in flow table 42A, as well as, determine the corresponding application ID associated with the flow. In this manner, classifier 30 may determine the application ID associated with the flow either through analysis or by accessing flow table 42A.

Classifier 30 may also determine whether each of LAN packets 36 represent a request for content, such as content stored within public network 18 or data center 24. Classifier 30 may base this determination on information or application-layer data stored to a payload of each of LAN packets 36. Classifier 30 may again invoke or execute one or more of the above described application-specific modules. The application-specific modules may parse the application-layer data of packets 36 to determine whether each of packets 36 requests content. For example, classifier 30 may include an HTTP application module, which classifier 30 may invoke upon identifying one of packets 36 as corresponding to an HTTP application. The HTTP application module may parse this packet 36 and determine whether the particular one of packets 36 requests content, e.g., the packet is an HTTP GET packet. The application-specific modules may also return information or an identifier that identifies the content requested. To continue the above HTTP example, the HTTP application module may return an HTTP link that uniquely identifies the requested content.

Using these determine application ID and information that identifies the requested content or request information, classifier 30 accesses application table 42B. Classifier 30 may, for example, use the application ID as a key to look-up an application state corresponding to the application uniquely identified by the application ID. As describe above, the application state may indicate whether the content is stored locally or internally within either of the memories of client WX 12A. For example, an HTTP application state may contain a list of HTTP links identified as being locally stored to client WX 12A and the request information may comprise an HTTP link. Those links within the list may represent content previously request by a client device, such as client device 26, and retrieved from a source external from client WX 12A, such as public network 18 or data center 24. In other words, classifier 30 may determine whether or not the content currently request by client device 26 has been previously retrieved from a device external to client WX 12A and stored internally within client WX 12A. Classifier 30 may compare the HTTP link to each of the HTTP links in the list.

If one of the HTTP links of the list matches the HTTP link of the requested content, classifier 30 may issue, to memory management module 34, a request to load one or more cached data objects 38 corresponding to the request content, e.g., the HTTP link, from the slower storage device to the high-speed memory. Typically, classifier 30 issues a "read" memory request to memory management module 34 that contains a pointer or other information that uniquely identifies the requested content.

In response to the "read" memory request, memory management module 34 may first determine whether the requested content resides within the storage device or the memory maintained or managed by memory management module 34. If already present in the high-speed memory, memory management module 34 may mark or otherwise indicate that the particular one of cached data objects 38 should not be moved from this memory to the storage device.

If not stored within the high-speed memory, memory management module 34 may retrieve the corresponding one or more of cached data objects 38 from the slower storage device and load these cached data objects 38 to the high-speed memory. Thus, memory management module 34 loads the requested content, e.g., the corresponding one or more of cached data objects 38, to the high-speed memory while the corresponding one of packets 36 is waiting to be processed in one of queues 40. This parallel processing may enable client WX 12A to more efficiently respond to packets 36 that request content stored locally to client WX 12A and thereby reduce response times.

Regardless of whether the content is stored locally within client WX 12A, classifier 30, either before or subsequent to issuing the request to memory management module 34, may store each of packets 36 to an appropriate one of queues 40. That is, classifier 30 may store each of packets 36 to an appropriate one of queues 40 based on information contained in the application state, e.g., a level, type, or quality of service, accessed for each of packets 36. Classifier 30 may also tag each of packets 36 with the corresponding application ID by for example associating metadata specifying the application ID with each of packets 36 stored in queues 40.

Meanwhile or simultaneous with the above operations, packet processing module 32 may continuously iterate through queues 40 and retrieve or pop packets 36 and the associated tag (e.g., metadata defining the corresponding application ID) stored to queues 40. Upon retrieving or popping one of packets 36 and the associated tag, packet processing module 32 may determine whether the retrieved one of packets 36 requests content. Packet processing module 32 may use the associated tag, e.g., application ID, to access an application state of application table 42B corresponding to the application uniquely identified by the application ID. Packet processing module 32 may also invoke or execute one or more application-specific modules to parse the application-layer data of each of packets 36 retrieved from queues 40, similar to classifier 30, as described above.

Packet processing module 32 may then utilize the information identifying the requested content, e.g., an HTTP link, to determine whether the corresponding application state indicates the requested content is stored locally within client WX 12A. Again, similar to classifier 30 above, if packet processing module 32 determines that the requested content is not stored locally, e.g., that the HTTP link corresponds to an HTTP link or object listed in the HTTP application state, packet processing module 32 may forward the one or a copy of the one of packets 36 to WAN 14 as WAN packets 37.

In some instances, packet processing module 32 may compress one or more packets 36 prior to forwarding these packets 36 to WAN 14 if the content is directed to a network that utilizes a server WX, such as server WX 12B. Packet processing module 36 may access flow table 42A to determine whether a corresponding intermediate device, e.g., server WX 12B, services the destination IP address. If so, packet processing module 32 may compress those packets 36 having a destination IP address serviced by server WX 12B prior to forwarding these packets 36 to WAN 14. If no intermediate network device, such as server WX 12B, services the corresponding destination IP addresses, packet processing module 32 may forward these packets 36 without first compressing them.

After forwarding these packets 36 for which the requested content was determined not to be locally cached, packet processing module 32 may place the one or the copy of the one of packets 36 in a holding queue (not shown in FIG. 2), while packet processing module 32 waits for a response from the remote servicer containing the requested content. Packet processing module 32 may proceed to process other packets while waiting for the requested content. Upon receiving the response containing the requested content, packet processing module 32 may parse the content from the response, cache the content as one or more cached data objects 38, update the application state of application table 42B corresponding to the application ID associated with the one of the packets 36 to indicate that the content is stored locally within control unit 28, and forward the response to the requesting client device, e.g., client device 26.

If packet processing module 32, however, determines that the requested content is stored or cached locally within client WX 12A, packet processing module 32 may then issue a request to memory management module 34 that requests one or more cached data objects 38 corresponding to the requested content. At this point, memory management module 34 should have pre-fetched or otherwise loaded the requested content, e.g., one or more cached data objects 38 corresponding to the requested content, from the slower storage device to the high-speed memory such that the one or more cached data objects 38 corresponding to the requested content are available.

In some instances, especially if many requests to load content are issued within a short period of time (e.g., period of high network congestion), however, memory management module 34 may not have timely processed the request issued by classifier 30 and the requested content, e.g., one or more of cached data objects 38, may not be available. Memory management module 34, in these instances, may issue a message to packet processing module 32 indicating that the requested content, e.g., one or more of cached data objects 38, is not yet ready or available.

Packet processing module 32, in response to this message, may forward a copy of the one of packets 36 requesting the unavailable content to the remote server, possibly, as described above, after compressing the copy of the one of packets 36 and place the original one of packets 36 back at the top of one of queues 40 or within the separate holding queue (not shown in FIG. 2). Packet processing module 32 need not necessarily forward the copy and queue the original, but may instead forward the original and queue the copy. The designation of a copy and an original should not be construed as a limitation on the techniques described herein. As a result of sending the copy (or original), packet processing module 32 may ensure that the failure to timely retrieve the cached content does not delay the response to the one of packets 36 beyond the time necessary to retrieve the content from the remote service. In effect, packet processing module 32 begins a race, the result of which ensures that response times do not extend beyond the time necessary to retrieve the content from the remote server.

Upon receiving the requested content as one or more cached data objects 38 from memory management module 34 (either after being delayed or directly upon first de-queuing the one of packets 36), packet processing module 32 may generate a response containing the requested content based on the content as represented by one or more of cached data objects 38. Packet processing module 32 next forwards the response to the device that requested the content, e.g., client device 26.

Assuming low network congestion, pre-fetching by classifier 30 may enable packet processing module 32 to more efficiently respond to packets 36 requesting cached content because the requested content, e.g., one or more of cached data objects 38, are loaded into the high-speed memory while packets 36 are queuing and available for near immediate use by packet processing module 32. Thus, packet processing module 32 may respond to packets 36 without having to wait for cached content, e.g., one or more of cached data objects 38, to be loaded from the slower storage device to the high-speed memory, thereby reducing response times.

However, even in periods of high network congestion, packet processing module 32, by issuing the request for content, e.g., the one of packets 36, to the remote server, may ensure response times do not extend longer than the time necessary to retrieve the content from the remote server. This failsafe, as described below in more detail, may be activated upon determining the level of congestion in WAN 14 to further determine whether forwarding the one of packets 36 would actually reduce response times or result only in a waste of process cycles and bandwidth.

Figure 3:
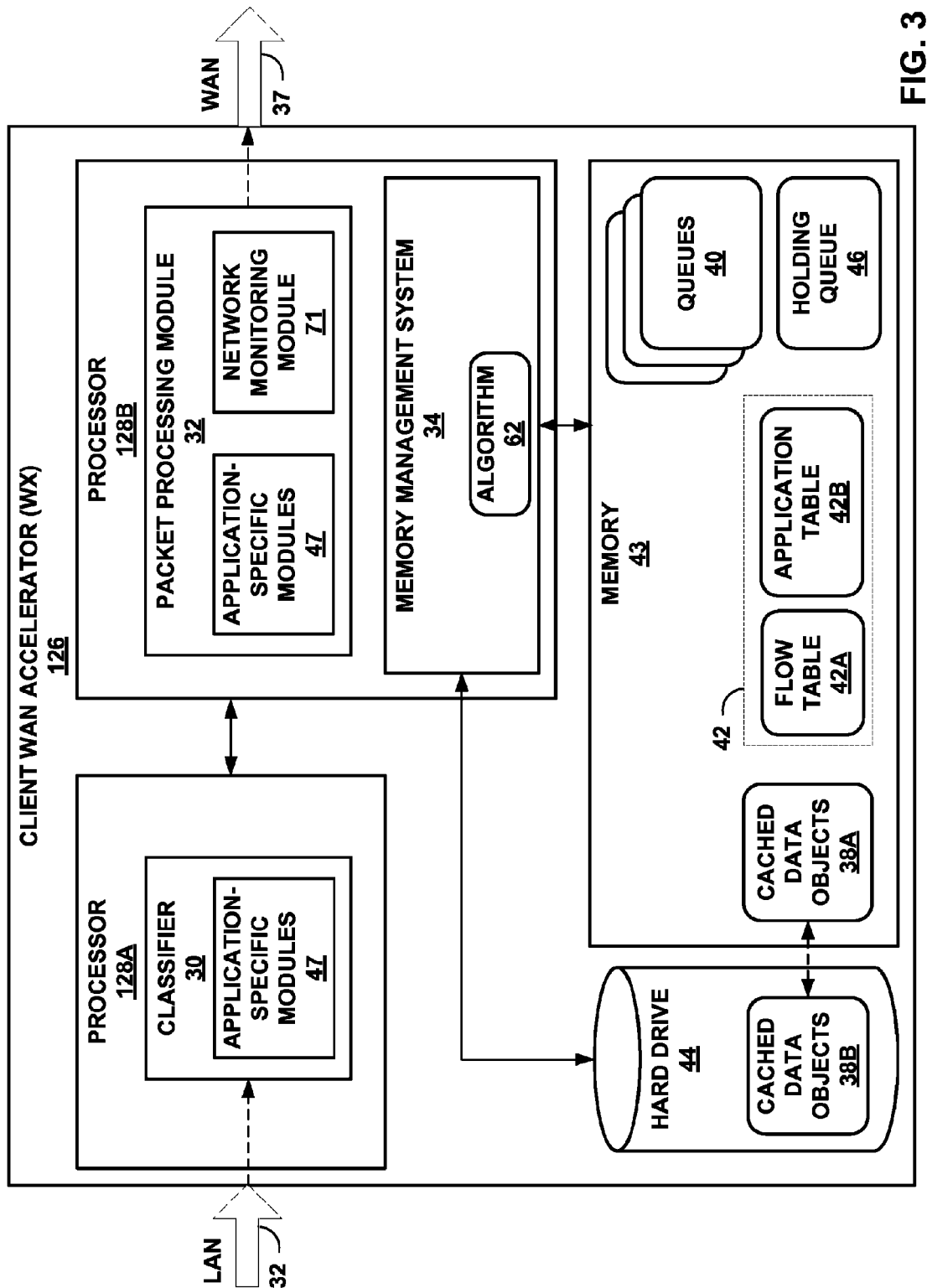
FIG. 3 is a block diagram illustrating the client WX of FIG. 1 in more detail from an architectural perspective.

FIG. 3 is a block diagram illustrating client WX 12A of FIG. 1 in more detail from an architectural perspective. That is, client WX 12A is depicted in FIG. 3 in terms of the interaction between various components, modules and/or elements with regard to the underlying physical hardware components or architecture. While described with respect to particular underlying hardware components, the techniques may be implemented by any of hardware components and the invention should not be limited to the exemplary embodiment described below.

As shown in FIG. 3, client WX 12A includes one or more processors 40, a first memory 43 and a mass storage device, which is shown as hard drive 44. Processors 40 may represent one or more programmable processors that execute instructions stored to either memory 43 or hard drive 44 that cause the processor to perform the techniques described herein. Processors 40 may execute classifier 30 and packet processing module 32, both of which are described above in detail. Additionally, processors 40 may execute memory management system 34. Each of classifier 30, packet processing module 32 and memory management system 34 may, in this instance, comprise software or computer programs that one or more processors 40 may execute to perform the techniques described herein.

Memory 43 may comprise a high-speed memory, such as one or more Random Access Memories (RAMs), one or more Dynamic RAMs (DRAMs), one or more Static RAMs (SRAMs), one or more Flash memories, one or more Nano-RAMs (NRAMs), one or more Zero capacitor RAMs (Z-RAMs), one or more Twin Transistor RAMs (TTRAMs), or one or more of any other high-speed or readily accessible static or dynamic memories. Moreover, memory 43 may be organized so as to include one or more levels of a tiered, high-speed data caches, one or more of which may be integrated within processor 40. Hard drive 44 may comprise a second, mechanical or slower storage device having one or more electromagnetic platters to which data may be read and stored through mechanical manipulation of one or more read-write heads and the corresponding platters.

Memory 43 may store cached data objects 38A that represents a subset of the data objects cached by client WX 12, queues 40, tables 42 and a holding queue 46. Hard drive 44 may also store cached data objects 38B that represent all or a portion of the data objects currently cached by client WX 12, where cached data objects 38A, 38B may be collectively referred to as "cached data objects 38." That is, cached data objects 38A, 38B may each represent portions of the collective whole of cached data objects 38, and cached data objects 38A may represent a most-recently used subset of cached data objects 38B. Holding queue 46 represents the above described holding queue for temporary holding or storage of packets 36 waiting for further processing by packet processing module 32. While shown as storing cached data objects 38A, queues 40, tables 42 and holding queue 46, the second storage device, e.g., hard drive 44, may store one or more of these data objects, queues, and tables.

Moreover, while described below with respect to read and write requests to memory management system 34, the invention as described herein should not be limited strictly to these indirect memory access methods. In some embodiments, classifier 30 may directly reference memory 43 and hard drive 44 without going through memory management system 34, particularly when accessing queues 40, tables 42, and holding queue 46. The reference to read and write requests below is merely for exemplary purposes to illustrate the relative sequence of events and should not be construed as limiting the invention to any one particular method of accessing memory 43 and hard drive 44.

Initially, classifier 30 may receive LAN packets 36 either directly or indirectly (e.g., via an input buffer) and classify each of packets 36, as described above. In particular, classifier 30 may parse or otherwise extract a five-tuple from each of packets 36 and access flow table 42A of memory 42 by issuing a read request 48 to memory management system 34. Memory management system 34 may, based on this request, access flow table 42A and retrieve a flow entry corresponding to the five-tuple or determine that no flow entry corresponds to the five-tuple. Memory management system 34 may then issue a read response 50 to read request 48 either providing the flow entry or indicating that no flow entry exists for the corresponding five-tuple.

If read response 50 indicates that no entry exists, classifier 30 may invoke one or more of application-specific modules 47 to determine an application to which each of packets 36 corresponds. Application-specific modules 47 may each represent modules that can be dynamically loaded and executed by classifier 30. As described above, application-specific modules 47 may determine, based on information parsed or otherwise extracted from a header, a payload, or both a header and a payload of each of packets 36, whether each of packets 36 correspond to a particular application. That is, application specific modules 37 may determine an application ID identifying an application to which each of packets 36 correspond, and may apply application signatures to the header and/or payload of the packet so as to make the determination. Upon identifying an application to which each of packets 36 corresponds, classifier 30 may issue a write request 52 to memory management system 34 that includes the corresponding five-tuple and application ID, as well as, any other information pertinent to a particular flow. Memory management system 34 may update flow table 42A based on request 52 to add a new flow entry to flow table 42A.

If read response 50, however, includes a flow entry, classifier 30 may parse the flow entry to determine an application (by way of parsing an application ID) to which each of packets 36 corresponds. Regardless of whether parsed from a flow entry or determined by invoking one or more application-specific modules 47, classifier 30 determines an application ID, which it then uses to access application table 42B. In particular, classifier 30 may issue a read request 54 that includes an application ID and requests an application state stored in application table 42B to memory management system 34. Memory management system 34, based on request 54, accesses application table 42B to retrieve an application state corresponding to the application identified by the application ID. If no application state exists for a given application ID, memory management system 34 may provide via read response 56 an indication that no application state exists for the given application ID, otherwise memory management system 34 provides the corresponding application state in read response 56.

If no application state exists for the corresponding application ID, classifier 30 may issue a write request 58 to memory management system 34 requesting that the one of packets 36 (for which no application state exists) be written to an appropriate one of queues 40. Classifier 30 may determine an appropriate one of queues 40 based on information extracted from the one of packets 36, such as a level, type, or quality of service field, or stored to flow table 42A.

If an application state exists for the corresponding application ID, classifier 30 may again invoke one or more of application-specific modules 47 to determine whether the one of packets 36 represents a request for content from a network resource, such as a web server or database. As described above, classifier 30 may invoke one of application-specific modules 47 corresponding to an application identified by an application ID. That one of application-specific modules 47 may parse or otherwise extract application-layer data from all or only a subset of the payload of the one of packets 36 to determine whether this packet 36 requests content.

For example, application-specific modules 47 may be configured to examine only a small portion of the payload based on the determined type of network application (e.g., HTTP) so as to efficiently determine whether the packet requests content from the network without requiring full processing of the packet. As one example, for HTTP requests, application-specific modules 47 may locate an HTTP header of the application-layer data within the payload and compare only certain bytes of data within that HTTP header to determine whether the packet is an HTTP request message that contains an HTTP GET command.

If this packet 36 requests content, the corresponding one of application-specific modules 47 may further process specific portions of the payload to extract and return specific information necessary to identify the requested content. For example, if the initial bytes examined indicate the packet is an HTTP request containing an HTTP GET command, the application-specific modules 47 may extract a universal resource locator (URL) immediately following the GET command. Classifier 30 may next compare the information identifying the requested content to objects of the application state to determine whether the requested content is stored locally, as described above. In this way, minimal memory access operations need be performed to trigger the pre-fetching of the cached content from the internal storage device 44 of client WX 12 for transfer to memory 43 used during packet assembly at the time the client WX assembles the response.

If not stored locally, classifier 30 may issue the above described write request 58 to write the one of packets 36 to an appropriate one of queues 40. If stored locally, classifier 30 may issue a read request 60 to memory management system 34 to initiate retrieval of the requested content. In response to read request 60, memory management system 34 may locate the requested content in one of hard drive 44 or memory 43. If already present in memory 43, memory management system 34 may retrieve one or more data objects from cached data objects 38A that represent the requested content, which in effect may, depending on algorithm 62, mark those objects of cached data objects 38B such that they will not be deleted. If not present in memory 43, memory management system 34 may retrieve one or more data objects from cached data objects 38B that represent the requested content and, in the process, transfer these one or more data objects from cached data objects 38B of hard drive 44 to cached data objects 38A of memory 43. In this manner, classifier 30 may "pre-fetch"

the requested content and parallelize transfer of the requested content to memory 43 while the corresponding or requesting one of packets 36 is queued.

In other words, either preceding or subsequent to issuing read request 60, classifier 30 may issue write request 58 to write the requesting one of packets 36 to an appropriate one of queues 40. Memory management system 34 may therefore transfer the one or more cached data objects corresponding to the requested content from hard drive 44 to memory 43 while the requesting one of packets 36 is queued in one of queues 40. Memory management system 34 may have previously transferred this requested content from memory 43 to hard drive 44 due to algorithm 62, which as described above, may manage the storage of cached data objects 38 between memory 43 and hard drive 44.

As a result of this parallel operation, the techniques, in one aspect, may reduce response times. For example, packet processing module 32 may, at some later time, pop or retrieve this requesting one of packets 36 from queues 40 by issuing a read request 64 to memory management system 34, which retrieves and returns via a read response 66 the requesting one of packets 36 stored to an appropriate one of queues 40. As described above, each of packets 36 stored to queues 40 may also be associated with a tag or metadata that specifies the application ID to which each of these packets 36 are associated. Thus, write request 58 issued by classifier 30 may request not only that each of packets 36 be written but also that a corresponding tag or metadata also be written with each of packets 36 to an appropriate one of queues 40.

Packet processing module 32 may use the application ID stored in the tag associated with each of packets 36 to invoke a corresponding one of application-specific modules 47. This one of application-specific modules 47 may determine, as described above, whether the requesting one of packets 36 requests content and, assuming it determines that the requesting one of packets 36 does request content, issue a read request 68 to memory management system 34 requesting the requested content. Considering the pre-fetch by classifier 30, memory management module 34, in some instances, may already have loaded the one or more data objects corresponding to the requested content from hard drive 44 to memory 43 while packets 36 were queued in queues 40. Memory management module 34, therefore, upon receiving request 68, may retrieve these pre-loaded one or more data objects from cached data objects 38A, and forward this requested content as a read response 70 to packet processing module 32. In this manner, the techniques may reduce response times when compared with conventional network caching devices.

In another aspect, the techniques may also limit response times to the time necessary to retrieve the content from the remote server by enabling the above described race condition. For example, in instances where client devices of branch network 22, e.g., client device 26, issue a number of requests for content and that content is cached locally within either of memory 43 or hard drive 44, requests to access memory 43 and hard drive 44 may backup, thus causing delay. The delay may be further increased if the conventional network caching device employs an inefficient algorithm to manage the storage device and memory or if the requests occur in an unexpected pattern with either or both instances resulting in the conventional network caching device continually transferring cached data objects between the storage device and memory. In these instances, response times may increase beyond the time necessary to retrieve the content from the remote server.

Client WX 12A and particularly, packet processing module 32, may prevent such a delay by forwarding the requesting one of packets 36 (or a copy thereof) to the remote server via WAN 14 despite having the requesting content locally cached in either one of memory 43 or hard drive 44. That is, packet processing module 32 may receive, in response to request 68, a read response 70 indicating that the requested content, e.g., one or more of cached data objects 38, has not yet been retrieved. Packet processing module 32 may then issue a write request 72 to write a copy of the packet to holding queue 46 and forward the packet to WAN 14 as one of WAN packets 37 to enable the race.

In some embodiments, packet processing module 32 may employ a network monitoring module 71 to monitor the level of congestion of the network, e.g., WAN 14. Network monitoring module 71 may issue periodic packets or monitor packets 37 and associated response packets to the issued packets or packets 37 to determine a level of congestion or perform some other analysis to determine this level of congestion. Network monitoring module 71 may next compare the level of congestion to a pre-defined, such as by an administrator or other user, or dynamic, such as one based on the monitored statistics, congestion threshold. If the level of congestion is below the congestion threshold, network monitoring module 71 may forward the packet. If not, network monitoring module 71 may not forward the packet, thereby conserving the needless expenditure of bandwidth.

By forwarding this packet to WAN 14 and enabling the race condition, packet processing module 32 may limit response time to approximately the time necessary to retrieve the content from the remote server. Conventional network caching devices, by failing to provide such a failsafe or enable the race condition, may inordinately delay responses to packets by waiting until the content is retrieved from local memories, while client WX 12A issues the packet and attempts to retrieve the content from local memory simultaneously, thereby ensuring that response times do not exceed response times calculated when retrieving the content from the remote servers.

Figure 4:
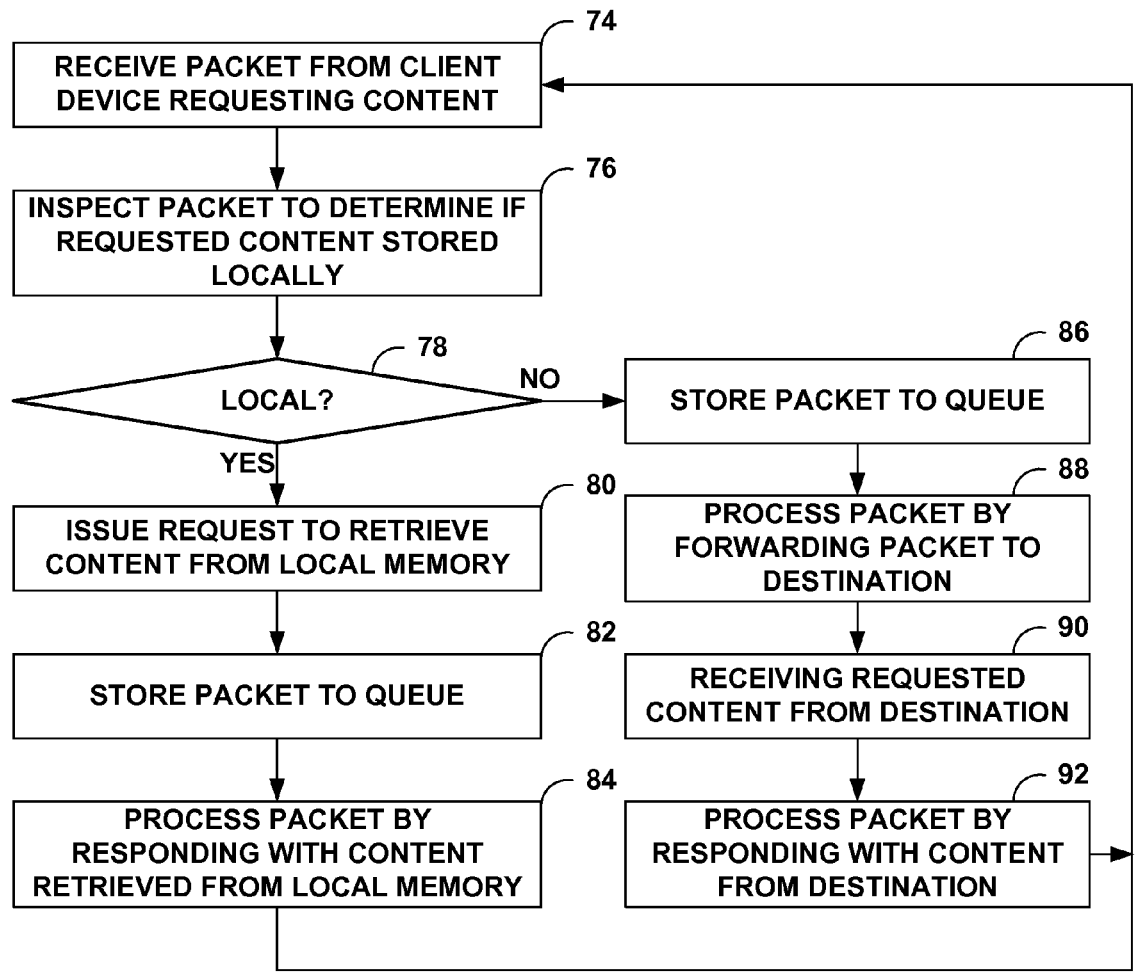
FIG. 4 is a flowchart illustrating exemplary operation of an intermediate network device in more detail.

FIG. 4 is a flowchart illustrating exemplary operation of an intermediate network device, such as client WX 12A of FIG. 2, in more detail. Initially, classifier 30 of client WX 12A (FIG. 2) may, as described above, receive a packet, e.g., one of LAN packets 36, from a client device of a first network, e.g., client device 26 of branch network 22 (FIG. 1), that requests content from a remote network device of a second network, e.g., a server of public network 18 or data center 24 of campus network 20 (74). Classifier 30 may, also as described above, inspect the one of packets 36 to determine whether the requested content has been previously cached to either of a storage device and a memory (76).

Based on this determination, classifier 30 may, again as described above, issue a request to begin retrieves and loading the requested content, e.g., one or more of cached data objects 38, from the storage device to the memory. That is, if the classifier 30 determines the content is stored locally to either the storage device or the memory ("YES" 78), classifier 30 may issue a request, such as the above described read request, to begin retrieving and loading the requested content or one or more of cached data objects 38 corresponding to the requested content from the storage device to the memory (80). The request may be forwarded to memory management module 34, which in response to this request, begins loading the one or more cached data objects 38 corresponding to the requested content from the storage device to the memory. If the cached data objects 38 corresponding to the requested content are already stored to the memory, memory management module 34 may mark these objects 38 such that they remain in, continued to be stored to, or otherwise are not removed from the memory.

Classifier 30 may then store the one of LAN packets 36 to one of queues 40 of client WX 12A (82). Classifier 30 may, as described above, associate an application ID or other identifier with this one of packets 36 in one of queues 40. Packet processing module 32 may processes this one of packets 36 by retrieving this one of packet 36 from the one of queues 40, generating a response to this one of packets 36 that includes the requested content loaded in the memory and forwarding the response to the client device that requested the content (84). As described above, packet processing module 32 may also retrieve the application ID or other identifier associated with this one of packets 36 in order to facilitate determining whether this one of packets 36 requests content and subsequent access to application table 42B.

If, however, classifier 30 determines that the requested content is not stored locally within either of the first or second memories ("NO" 78), classifier 30 proceeds to store this one of packets 36 to one of queues 40 without causing memory management module 34 to begin loading the requested contents, e.g., one or more of cached data objects 38, from the storage device to the memory (86). Classifier 30 may, for example, store this one of packets 36 to the one of queues 40 without transmitting the above described read request to memory management module 34.

Once stored, packet processing module 32 may retrieve this one of packets 36 from the one of queues 40 and process this one of packets 36 by forwarding this one of packets 36 to a destination indicated by this one of packets 36, e.g., a destination indicated by a destination IP address (88). Packet processing module 32 may, in some instances, compress or perform other processing to reduce consumption of bandwidth across, for example, links 16. In response to forwarding this one of packets 36, packet processing module 32 may receive the return packet from the destination that includes the requested content, whereupon packet processing module 32 may, as described above, further process the one of packets 36 by responding to this one of packets 36 with a response packet that includes the requested content from the destination (90, 92). Although not shown in FIG. 4, packet processing module 32 may also cache this requested content received from the destination to either the first or second memories via interactions with memory management module 32. After processing this one of packets 36, client WX 12A may continue to receive and process packets 36 in accordance with the techniques as described above (74-92).

Figure 5:
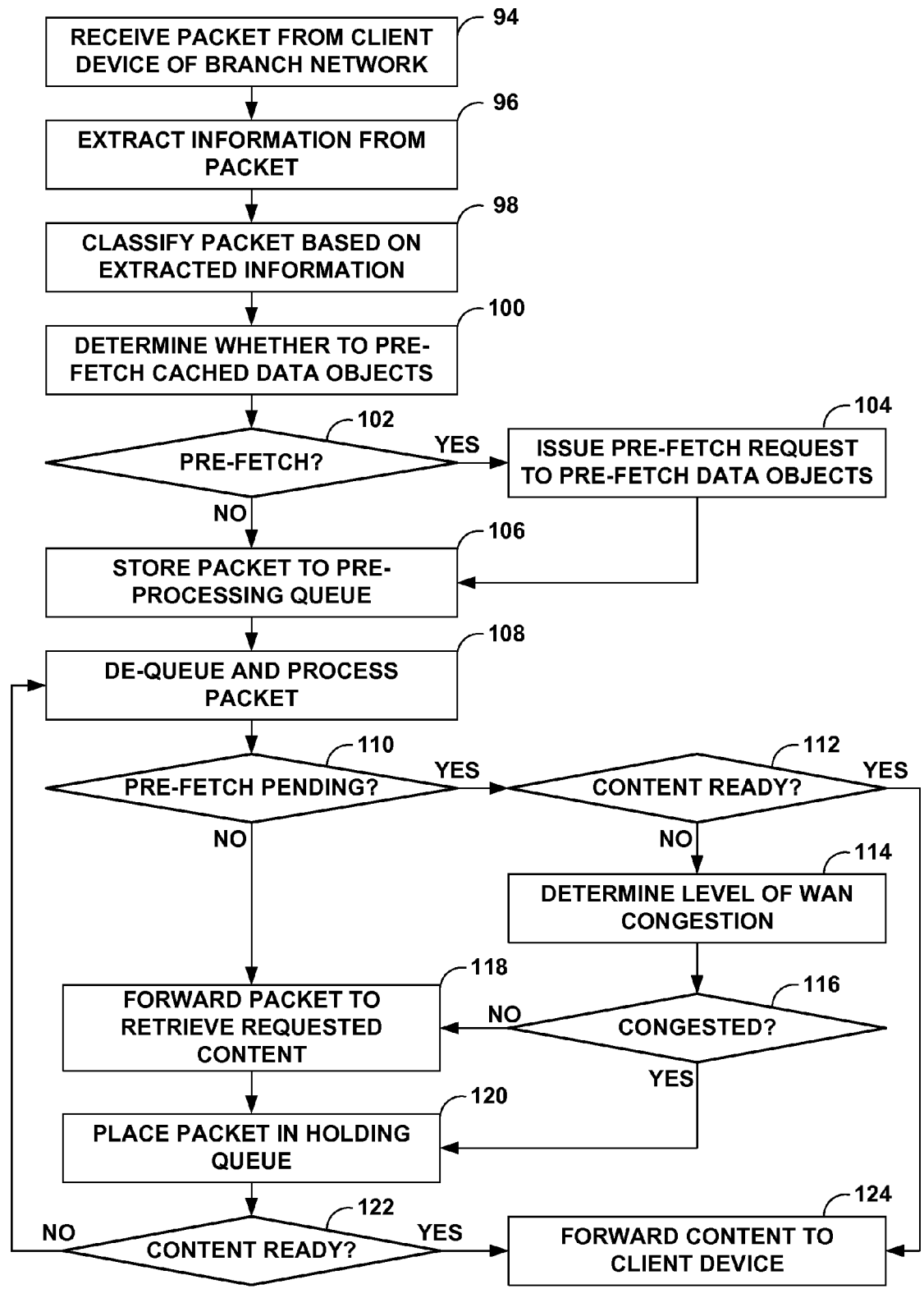
FIG. 5 is a flowchart illustrating exemplary operation of one embodiment of an intermediary network device in performing the techniques of the invention described herein.

FIG. 5 is a flowchart illustrating exemplary operation of one embodiment of an intermediary network device, such as client WX 12A of FIG. 3, in performing the techniques of the invention described herein. Initially, classifier 30 of client WX 12A (FIG. 3) may, as described above, receive a packet, e.g., one of LAN packets 36, from a client device of a first network, e.g., client device 26 of branch network 22 (FIG. 1), that requests content from a remote network device of a second network, e.g., a server of public network 18 or data center 24 of campus network 20 (94). Classifier 30 may, also as described above, inspect the one of packets 36 to determine whether the requested content has been previously cached to either of a storage device and a memory.

For example, classifier 30 may inspect the one of packets 36 by extracting information from a header, a body, or both the header and the body of the one of packets 36 (96). Classifier 30 may, based on this extracted information, classify this one of packets 36 by determining to which flow this one of packets 36 belongs (98). In this instance, classifier 30 may extract the above described five-tuple and perform a lookup in flow table 42A using the five-tuple as a key. If no entry exists, classifier 30 may invoke one or more of applications-specific modules to classify the packet as belonging to a particular application and update flow table 42A by adding a flow entry corresponding to the five-tuple and which identifies the application to which the flow belongs, e.g., by also storing a corresponding application ID identifying the application in the new flow entry.

If a flow entry exists in flow table 42A for the extracted five-tuple, classifier 30 may determine the corresponding application ID and invoke one of application-specific modules 47 corresponding to the application identified by the application ID. Regardless of whether a flow entry exists, classifier 30 may, as described above, determine whether the one of packets 36 requests content as a result of the inspection by the corresponding one of the application-specific modules 47. That is, the corresponding one of the application-specific modules 47 may parse information from the one of packets 36 identifying the requested content, e.g., an HTTP link, file location or other resource identifier. Using this resource identifier or content request and the application ID as a key, classifier 30 may perform a lookup in application table 42B to determine whether to pre-fetch one or more cached data objects 38 corresponding to the requested content or resource identified in the one of packets 36 (100).

If application table 42B indicates that the content is stored locally within either or memory 43 or hard drive 44 ("YES" 102), classifier 30 may issue a pre-fetch read request, e.g., read request 60, to memory management module 34 to pre-fetch cached data objects or data objects 38 (104). If not stored locally, e.g., no pre-fetch is required ("NO" 102), or after issuing the pre-fetch request, classifier 30 may forward or store the one of packets 36 to one of pre-processing queues 40, as well as, in some instances, a tag, metadata or other data identifying the application to which the one of packets 36 belongs (106). As described above, classifier 30 may issue a series or plurality of requests (e.g., requests 48, 52, 54, etc.) and receive a series or plurality of responses (e.g., responses 50, 56, etc.) to and from memory management system 34 to perform the above operations.

Packet processing module 32 may, at some later point, de-queue and process the one of packets 36 stored to one of pre-processing queues 40 (108). Packet processing module 32 may, as described above, also extract the tag identifying the application to which the one of packets 36 belongs. Based on this tag, packet processing module 32, also as described above, may invoke a corresponding one of application-specific modules 47 to determine whether the one of packets 36 requests content, and if so, an identifier identifying the requested content, e.g., an HTTP link. Using the application ID and identifier as keys, packet processing module 32 may access application table 42B to determine whether the requested content is stored locally. If stored locally, packet processing module 32 issue a request to retrieve the locally cached content, e.g., one or more of cached data objects 38, corresponding to the requested content.

If memory management module 34 has not yet serviced preceding pre-fetch request issued by classifier 30, the pre-fetch request may still be pending (110). In this instance, memory management module 32 may determine whether the data is ready (112), and if not, indicate that the data is not yet ready to packet processing module 32. Upon receiving this indication that the data is not ready, packet processing module 32 may employ network monitoring module 71 to determine the level of congestion on WAN 14 in the manner described above (114).

If network monitoring module 71 indicates that the network, e.g., WAN 14, is not congested ("NO" 116), packet processing modules 32 may begin the above described race condition by forwarding the one of packets 32 to WAN 14 as one of WAN packets 37 to retrieve the requested content from the destination (118). If however network monitoring module 71 indicates the network, e.g., WAN 14, is congested ("YES" 116) or after sending the one of packets 36 on to its destination to begin the race, packet processing module 32 may store the one of packets 36 to a holding queue 46 (120).

After placing the one of packets 36 in holding queue 46, packet processing module 32 may process other ones of packets 36 stored to queues 40 ("NO" 122, 108-122). Once the content is ready (e.g., memory management module 32 has retrieved one or more cached data objects 38 corresponding to the requested content from either of memory 43 or hard drive 44 or client WX 12A has received the requested content from the destination), packet processing module 32 may retrieve the one of packets 36 stored to holding queue 46 and forward the requested content to the requesting client device (124). If the pre-fetch request is pending, e.g., previously issued by classifier 30, and the content, e.g., one or more cached data objects 38 corresponding to the content, is ready ("YES" 112), memory management module 34 may respond with content, whereupon packet processing module 32 may forward the requested content to the requesting client device, e.g., client device 26, encapsulated in a response packet (124). As described above, packet processing module 32 may issue a series or plurality of requests (e.g., requests 64, 68, etc.) and receive a series or plurality of responses (e.g., responses 66, 70, etc.) to and from memory management system 34 to perform some of the above operations.

Figure 6:
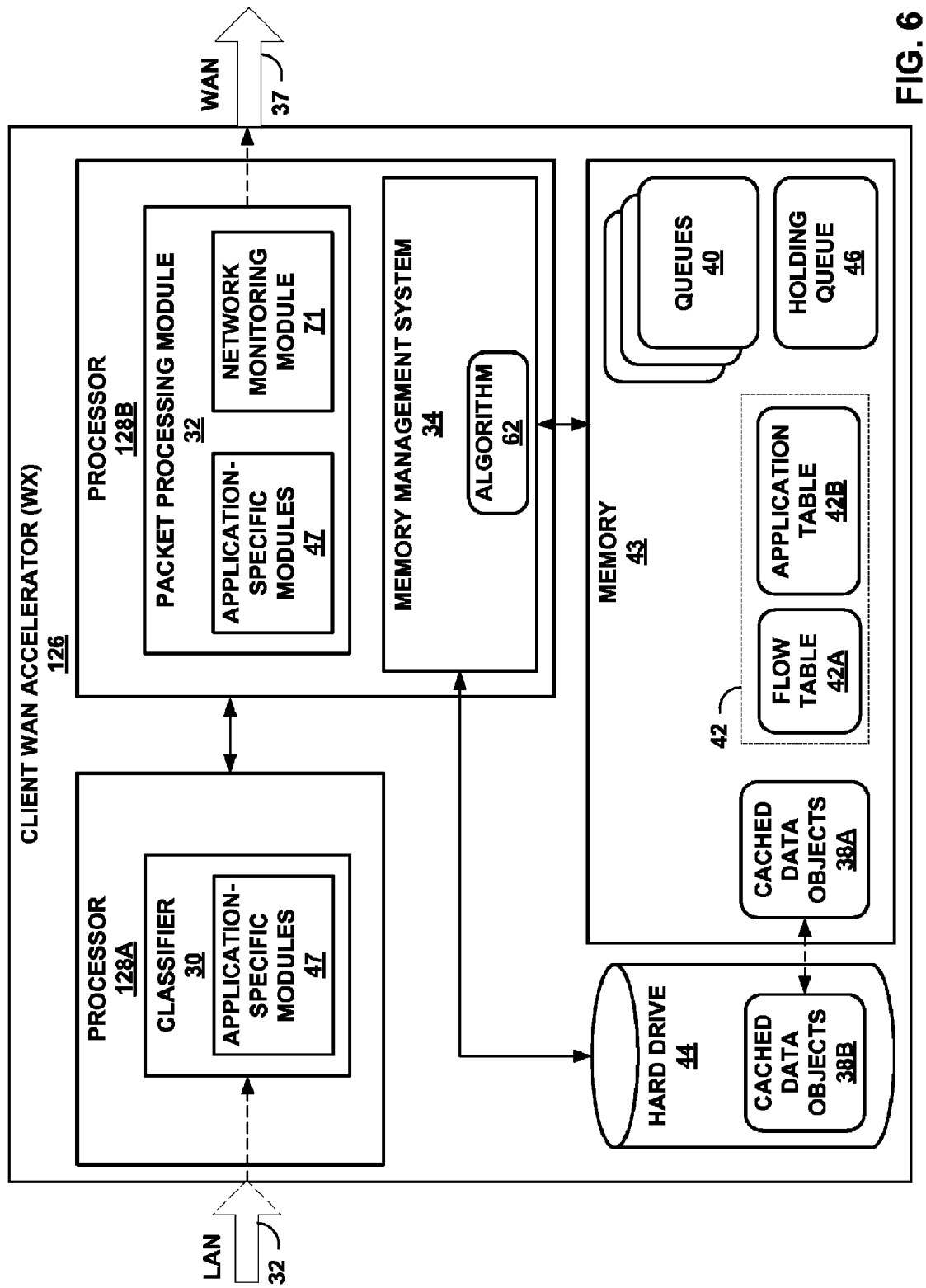
FIG. 6 is a block diagram illustrating another exemplary client WX that performs the techniques described herein.

FIG. 6 is a block diagram illustrating another exemplary client WX 126 that performs the techniques described herein. Client WX 126 may be substantially similar to client WX 12A of FIG. 3 in that it includes many of the same modules, elements, algorithms, memories, etc. Client WX 126 differs from client WX 12A in that client WX 126 includes at least two processors 128A, 128B ("processors 128"), where processor 128A executes classifier 30 and processor 128B executes packet processing module 32. As a result, classifier 30 may execute in parallel or simultaneous to the execution of packet processing module 32. Such parallel execution, as described above, may enable client WX 126 to more efficiently respond to incoming LAN packets 32 by reducing response times.

Various embodiments of the invention have been described. These and other embodiments are within the scope of the following claims.

The invention claimed is:

1. A method comprising:
  receiving, with an intermediate network device, a packet from a client device of a first network that requests content from a remote network device of a second network, wherein the intermediate network device is positioned between the client device and the remote network device;
  identifying, with a classifier module of the intermediate network device, an application protocol with which the packet conforms;
  determining, based on the identified application protocol, a portion of a payload of the packet that is necessary to inspect in order to determine whether the packet represents a request for content currently cached by the intermediate network device;
  inspecting, with a classifier module of the intermediate network device, only the determined portion of the payload of the packet prior to queuing the packet for subsequent full processing by the intermediate network device without inspecting a remaining portion of the payload;
  issuing, with the classifier module, a request to begin retrieving and loading the requested content from a mass storage device within the intermediate network device to a memory within the intermediate network device based on the determination;
  queuing, with the classifier module, the packet within a queue of the intermediate network device; and
  after queuing the packet, processing the packet with a packet processing module of the intermediate network device to assemble a response that includes the content from the memory.

2. The method of claim 1, wherein processing the packet comprises:
  retrieving the packet from the queue;
  retrieving the requested content from the memory;
  generating a response that includes the requested content retrieved from the memory; and
  forwarding the response to the client device that requested the content.

3. The method of claim 1, wherein inspecting the packet comprises:
  parsing, with the classifier module, a five-tuple from the packet that identifies a flow to which the packet corresponds;
  accessing, with the classifier module, a flow table stored within the intermediate network device based on the five-tuple to determine an application identifier (ID) associated with the flow to which the packet corresponds;
  parsing, with the classifier module, an identifier from the packet that uniquely identifies the requested content; and
  accessing an application table stored within the intermediate network device based on the identifier and application ID to determine whether the requested content has been previously cached to either of the memory and the mass storage device of the intermediate network device.

4. The method of claim 1,
  wherein issuing the request comprising issuing, with the classifier module, a read request to a memory management module of the intermediate network device based on the determination, and
  the method further comprising retrieving and loading, with the memory management module, one or more cache data objects corresponding to the requested content from the mass storage device to the memory in response to the read request and while the packet is queued within the queue.

5. The method of claim 1, wherein queuing the packet comprises queuing, with the classifier module, the packet and a tag that includes an application identifier (ID) identifying an application to which the packet belongs within the queue.

6. The method of claim 5, wherein processing the packet comprises:
  retrieving, with the packet processing module, the packet and the tag from the queue;
  accessing, with the packet processing module, an application table stored within the intermediate network device based on the application ID included within the tag to determine whether the requested content has been previously cached to either of the mass storage device and the memory;
  issuing, with the packet processing module, another request to a memory management module of the intermediate network device that causes the memory management module to retrieve one or more cached data objects corresponding to the requested content from the memory based on the determination made by the packet processing module;

receiving, with the packet processing module, the one or more cached data objects corresponding to the requested content from the memory management module in response to the other request;

generating the response that includes the one or more cached data objects corresponding to the requested content received from the memory management module; and forwarding the response to the client device that requested the content.

7. The method of claim 1,
wherein inspecting the packet comprises determining that the requested content has not been previously cached to either of the mass storage device and the memory of the intermediate network device,
wherein queuing the packet within the queue comprises queuing the packet without issuing the request to begin retrieving and loading the requested content,
wherein processing the packet comprises:
forwarding, with the packet processing module, the packet for which the requested content has not been previously cached to either of the mass storage device and the memory to the remote network device;
receiving, with the packet processing module, a response packet from the remote network device that includes the requested content;
caching the requested content received from the remote network device to the memory; and
forwarding the response packet to the client device that requested the content.

8. The method of claim 1,
wherein processing the packet further comprises:
issuing, with the packet processing module, another request to a memory management module requesting the requested content from the memory;
receiving, in response to the other request, an indication that the memory management module has not yet retrieved one or more cached data objects corresponding to the requested content from the mass storage device and loaded the one or more cached data objects into the memory;
determining, with the packet processing module, a level of congestion of an intermediate network between the first and second network over which network traffic between the first and second network travels in response to the indication that the content has not yet been retrieved; and
forwarding, with the packet processing module, the packet to the remote network device based on the level of congestion of the intermediate network.

9. The method of claim 8, wherein processing the packet further comprises:
receiving a response packet that includes the requested content from the remote network device before receiving the one or more cached data objects corresponding to the requested content from the memory management module in response to the other request; and
forwarding the response packet to the client that requested the content.

10. The method of claim 8, wherein processing the packet further comprises:
receiving the one or more cached data objects corresponding to the requested content from the memory management module before receiving a response packet that includes the requested content from the memory management module;
generating the response based on the one or more cached data objects corresponding to the requested content retrieved by the memory management unit from the memory; and
forwarding the response to the client device that requested the content.

11. The method of claim 1,
wherein the intermediate network device is a client wide area network (WAN) acceleration (X) device,
wherein the first network is a branch network located remote from an enterprise network, and
wherein the second network is the enterprise network.

12. An intermediate network device positioned between a client device of a first network and a remote network device of a second network, the intermediate device comprising:
a memory for caching a first plurality of cached data objects;
a mass storage device for caching a second plurality of cached data objects;
a queue;
a classifier module that receives a packet from the client device of the first network that requests content from the remote network device of the second network, identifies an application protocol with which the packet conforms, determines, based on the identified application protocol, a portion of a payload of the packet that is necessary to inspect in order to determine whether the packet represents a request for content currently cached by the intermediate network device, inspects only the determined portion of the payload of the packet prior to queuing the packet for subsequent full processing by the intermediate network device without inspecting a remaining portion of the payload to determine whether the requested content is cached to either the memory or the mass storage device, issues a request to begin retrieving and loading the requested content from the mass storage device within the intermediate network device to the memory based on the determination, and queues the packet within the queue; and
a packet processing module that, after queuing the packet, processes the packet to assemble a response that includes the content from the memory.

13. The intermediate network device of claim 12, wherein the packet processing module further retrieves the packet from the queue, retrieves the requested content from the memory, generates a response that includes the requested content retrieved from the memory, and forwards the response to the client device that requested the content.

14. The intermediate network device of claim 12, wherein the classifier module further parses a five-tuple from the packet that identifies a flow to which the packet corresponds, accesses a flow table stored within the intermediate network device based on the five-tuple to determine an application identifier (ID) associated with the flow to which the packet corresponds, parses an identifier from the packet that uniquely identifies the requested content, and accesses an application table stored within the intermediate network device based on the identifier and application ID to determine whether the requested content has been previously cached to either of the memory and the mass storage device of the intermediate network device.

15. The intermediate network device of claim 12, further comprising a memory management module that manages the first and second plurality of cached data objects, wherein the classifier module further issues a read request to the memory management module of the intermediate network device based on the determination, wherein the memory management module retrieves and loads one or more of the second plurality of cache data objects corresponding to the requested content from the mass storage device to the memory in response to the read request and while the packet is queued within the queue.

16. The intermediate network device of claim 12, wherein the classifier module further queues, within the queue, the packet and a tag that includes an application identifier (ID) identifying an application to which the packet belongs.

17. The intermediate network device of claim 16, further comprising a memory management module that manages the first and second plurality of cached data objects, wherein the packet processing module further:

retrieves the packet and the tag from the queue;

accesses an application table stored within the intermediate network device based on the application ID included within the tag to determine whether the requested content has been previously cached to either of the first and the second memories;

issues another request to the memory management module of the intermediate network device that causes the memory management module to retrieve one or more of the first plurality of data objects corresponding to the requested content from the memory based on the determination made by the packet processing module;

receives the one or more of the first plurality of cached data objects corresponding to the requested content from the memory management module in response to the other request;

generates the response that includes the one or more of the first plurality of cached data objects corresponding to the requested content received from the memory management module; and forwards the response to the client device that requested the content.

18. The intermediate network device of claim 12, wherein the classifier module determines that the requested content has not been previously cached to either of the memory and the mass storage device of the intermediate network device, wherein the classifier module also queues the packet without issuing a request to begin retrieving and loading the requested content, wherein the packet processing module forwards, with the packet processing module, the packet for which the requested content has not been previously cached to either of the memory and the mass storage device to the remote network device, receives, with the packet processing module, a response packet from the remote network device that includes the requested content, caches the requested content received from the remote network device to the memory, and forwards the response packet to the client device that requested the content.

19. The intermediate network device of claim 12, further comprising:

a memory management module that manages the first and second plurality of cached data objects, wherein the packet processing module further:

issues another request to the memory management module requesting the requested content from the memory;

receives, in response to the other request, an indication that the memory management module has not yet retrieved one or more of the second plurality of cached data objects corresponding to the requested content from the mass storage device and loaded the one or more of the second plurality of cached data objects into the memory as one or more of the first plurality of cached data objects;

determines a level of congestion of an intermediate network between the first and second network over which network traffic between the first and second network travels in response to the indication that the content has not yet been retrieved; and forwards the packet to the remote network device based on the level of congestion of the intermediate network.

20. The intermediate network device of claim 19, wherein the packet processing module further receives a response packet that includes the requested content from the remote network device before receiving the one or more of the first plurality of cached data objects corresponding to the requested content from the memory management module in response to the other request, and forwards the response packet to the client that requested the content.

21. The intermediate network device of claim 19, wherein the packet processing module further:

receives the one or more of the first plurality of cached data objects corresponding to the requested content from the memory management module before receiving a response packet that includes the requested content from the memory management module;

generates the response based on the one or more of the first plurality of cached data objects corresponding to the requested content retrieved by the memory management unit from the memory; and forwards the response to the client device that requested the content.

22. The intermediate network device of claim 12, wherein the intermediate network device is a client wide area network (WAN) acceleration (X) device, wherein the first network is a branch network located remote from an enterprise network, and wherein the second network is the enterprise network.

23. A network system comprising:

a first network that includes an intermediate network device and at least one client device; and a second network located remote from the first network and includes a remote network device, wherein the intermediate network device is positioned between the client device and the remote network device and comprises:

a memory for caching a first plurality of cached data objects;

a mass storage device for caching a second plurality of cached data objects;

a queue;

a classifier module that receives a packet from the client device of the first network that requests content from the remote network device of the second network, identifies an application protocol with which the packet conforms, determines, based on the identified application protocol, a portion of a payload of the packet that is necessary to inspect in order to determine whether the packet represents a request for content currently cached by the intermediate device, inspects only the determined portion of the payload of the packet prior to queuing the packet for subsequent full processing by the intermediate network device without inspecting a remaining portion of the payload to determine whether the requested content is cached to either the memory or the mass storage device, issues a request to begin retrieving and loading the requested content from the mass storage device within the intermediate network device to the memory based on the determination, and queues the packet within the queue; and a packet processing module that, after queuing the packet, processes the packet to assemble a response that includes the content from the memory.

24. The intermediate network device of claim 23, wherein the packet processing module further retrieves the packet from the queue, retrieves the requested content from the memory, generates a response that includes the requested content retrieved from the memory, and forwards the response to the client device that requested the content.

25. The network system of claim 23, wherein the intermediate network device further comprises a memory management module that manages the first and second plurality of cached data objects, wherein the classifier module issues a read request to the memory management module of the intermediate network device based on the determination, wherein the memory management module retrieves and loads one or more of the second plurality of cache data objects corresponding to the requested content from the mass storage device to the memory in response to the read request and while the packet is queued within the queue.

26. The network system of claim 23, wherein the intermediate network device further comprises a memory management module that manages the first and second plurality of cached data objects, wherein the packet processing module further issues another request to the memory management module requesting the requested content from the memory, receives, in response to the other request, an indication that the memory management module has not yet retrieved one or more of the second plurality of cached data objects corresponding to the requested content from the mass storage device and loaded the one or more of the second plurality of cached data objects into the memory as one or more of the first plurality of cached data objects, determines a level of congestion of an intermediate network between the first and second network over which network traffic between the first and second network travels in response to the indication that the content has not yet been retrieved, and forwards the packet to the remote network device based on the level of congestion of the intermediate network.

27. The network system of claim 26, wherein the packet processing module further receives a response packet that includes the requested content from the remote network device before receiving the one or more of the first plurality of cached data objects corresponding to the requested content from the memory management module in response to the other request, and forwards the response packet to the client that requested the content.

28. The network system of claim 26, wherein the packet processing module further receives the one or more of the first plurality of cached data objects corresponding to the requested content from the memory management module before receiving a response packet that includes the requested content from the memory management module, generates the response based on the one or more of the first plurality of cached data objects corresponding to the requested content retrieved by the memory management unit from the memory, and forwards the response to the client device that requested the content.

29. The network system of claim 23,
wherein the intermediate network device is a client wide area network (WAN) acceleration (X) device,
wherein the first network is a branch network, and
wherein the second network is the enterprise network.

30. A non-transitory computer-readable storage medium comprising instructions for causing a programmable processor to:

receive, with an intermediate network device, a packet from a client device of a first network that requests content from a remote network device of a second network, wherein the intermediate network device is positioned between the client device and the remote network device;

identify, with a classifier module of the intermediate network device, an application protocol with which the packet conforms;

determine, based on the identified application protocol, a portion of a payload of the packet that is necessary to inspect in order to determine whether the packet represents a request for content currently cached by the intermediate network device;

inspect, with the classifier module, only the determined portion of the payload of the packet prior to queuing the packet for subsequent full processing by the intermediate network device without inspecting a remaining portion of the payload;

issue, with the classifier module, a request to begin retrieving and loading the requested content from a mass storage device within the intermediate network device to a memory within the intermediate network device based on the determination;

queue, with the classifier module, the packet within a queue of the intermediate network device; and after queuing the packet, process the packet with a packet processing module of the intermediate network device to assemble a response that includes the content from the memory.

31. The computer-readable storage medium of claim 30, wherein the instructions further cause the processor to:

issue, with the packet processing module, another request to a memory management module requesting the requested content from the memory;

receive, in response to the other request, an indication that the memory management module has not yet retrieved one or more cached data objects corresponding to the requested content from the mass storage device and loaded the one or more cached data objects into the memory;

determine, with the packet processing module, a level of congestion of an intermediate network between the first and second network over which network traffic between the first and second network travels in response to the indication that the content has not yet been retrieved; and forwarding, with the packet processing module, the packet to the remote network device based on the level of congestion of the intermediate network.

32. The computer-readable storage medium of claim 31, wherein the instructions further cause the processor to:

receive a response packet that includes the requested content from the remote network device before receiving the one or more cached data objects corresponding to the requested content from the memory management module in response to the other request; and forward the response packet to the client that requested the content.

33. The computer-readable storage medium of claim 31, wherein the instructions further cause the processor to:
receive the one or more of the first plurality of cached data objects corresponding to the requested content from the memory management module before receiving a response packet that includes the requested content from the memory management module;
generate the response based on the one or more cached data objects corresponding to the requested content retrieved by the memory management unit from the memory; and
forward the response to the client device that requested the content.

34. A method comprising:
receiving, with an intermediate network device, a packet from a client device of a first network that requests content from a remote network device of a second network, wherein the intermediate network device is positioned between the client device and the remote network device;
inspecting, with a classifier module of the intermediate network device, the packet to determine whether the requested content is cached by the intermediate network device, wherein inspecting the packet comprises parsing, with the classifier module, a five-tuple from the packet that identifies a flow to which the packet corresponds, accessing, with the classifier module, a flow table stored within the intermediate network device based on the five-tuple to determine an application identifier (ID) associated with the flow to which the packet corresponds, parsing, with the classifier module, an identifier from the packet that uniquely identifies the requested content, and accessing an application table stored within the intermediate network device based on the identifier and application ID to determine whether the requested content has been previously cached to either of the memory and the mass storage device of the intermediate network device;
issuing, with the classifier module, a request to begin retrieving and loading the requested content from a mass storage device within the intermediate network device to a memory within the intermediate network device based on the determination;
queuing, with the classifier module, the packet within a queue of the intermediate network device; and
after queuing the packet, processing the packet with a packet processing module of the intermediate network device to assemble a response that includes the content from the memory.

35. A method comprising:
receiving, with an intermediate network device, a packet from a client device of a first network that requests content from a remote network device of a second network, wherein the intermediate network device is positioned between the client device and the remote network device;
inspecting, with a classifier module of the intermediate network device, the packet to determine whether the requested content is cached by the intermediate network device;
issuing, with the classifier module, a request to begin retrieving and loading the requested content from a mass storage device within the intermediate network device to a memory within the intermediate network device based on the determination;
queuing, with the classifier module, the packet and a tag that includes an application identifier (ID) identifying an application to which the packet belongs within a queue of the intermediate network device; and
after queuing the packet, processing the packet with a packet processing module of the intermediate network device to assemble a response that includes the content from the memory,
wherein processing the packet includes retrieving, with the packet processing module, the packet and the tag from the queue, and accessing, with the packet processing module, an application table stored within the intermediate network device based on the application ID included within the tag to determine whether the requested content has been previously cached to either of the mass storage device and the memory,
wherein processing the packet also includes issuing, with the packet processing module, another request to a memory management module of the intermediate network device that causes the memory management module to retrieve one or more cached data objects corresponding to the requested content from the memory based on the determination made by the packet processing module, and receiving, with the packet processing module, the one or more cached data objects corresponding to the requested content from the memory management module in response to the other request, and
wherein processing the packet further includes generating the response that includes the one or more cached data objects corresponding to the requested content received from the memory management module and forwarding the response to the client device that requested the content.

36. A method comprising:
receiving, with an intermediate network device, a packet from a client device of a first network that requests content from a remote network device of a second network, wherein the intermediate network device is positioned between the client device and the remote network device;
inspecting, with a classifier module of the intermediate network device, the packet to determine whether the requested content is cached by the intermediate network device;
issuing, with the classifier module, a request to begin retrieving and loading the requested content from a mass storage device within the intermediate network device to a memory within the intermediate network device based on the determination;
queuing, with the classifier module, the packet within a queue of the intermediate network device; and
after queuing the packet, processing the packet with a packet processing module of the intermediate network device to assemble a response that includes the content from the memory,
wherein processing the packet further comprises:
issuing, with the packet processing module, another request to a memory management module requesting the requested content from the memory;
receiving, in response to the other request, an indication that the memory management module has not yet retrieved one or more cached data objects corresponding to the requested content from the mass storage device and loaded the one or more cached data objects into the memory;
determining, with the packet processing module, a level of congestion of an intermediate network between the first and second network over which network traffic between the first and second network travels in response to the indication that the content has not yet been retrieved; and forwarding, with the packet processing module, the packet to the remote network device based on the level of congestion of the intermediate network.

37. The method of claim 36, wherein processing the packet further comprises:
receiving a response packet that includes the requested content from the remote network device before receiving the one or more cached data objects corresponding to the requested content from the memory management module in response to the other request; and
forwarding the response packet to the client that requested the content.

38. The method of claim 36, wherein processing the packet further comprises:
receiving the one or more cached data objects corresponding to the requested content from the memory management module before receiving a response packet that includes the requested content from the memory management module;
generating the response based on the one or more cached data objects corresponding to the requested content retrieved by the memory management unit from the memory; and
forwarding the response to the client device that requested the content.

39. An intermediate network device positioned between a client device of a first network and a remote network device of a second network, the intermediate device comprising:
a memory for caching a first plurality of cached data objects;
a mass storage device for caching a second plurality of cached data objects;
a queue;
a classifier module that receives a packet from the client device of the first network that requests content from the remote network device of the second network, parses a five-tuple from the packet that identifies a flow to which the packet corresponds, accesses a flow table stored within the intermediate network device based on the five-tuple to determine an application identifier (ID) associated with the flow to which the packet corresponds, parses an identifier from the packet that uniquely identifies the requested content, and accesses an application table stored within the intermediate network device based on the identifier and application ID to determine whether the requested content has been previously cached to either of the memory and the mass storage device of the intermediate network device, issues a request to begin retrieving and loading the requested content from the mass storage device within the intermediate network device to the memory based on the determination, and queues the packet within the queue; and
a packet processing module that, after queuing the packet, processes the packet to assemble a response that includes the content from the memory.

40. An intermediate network device positioned between a client device of a first network and a remote network device of a second network, the intermediate device comprising:
a memory for caching a first plurality of cached data objects;
a mass storage device for caching a second plurality of cached data objects;
a queue;
a classifier module that receives a packet from the client device of the first network that requests content from the remote network device of the second network, inspects the packet to determine whether the requested content is cached to either the memory or the mass storage device, issues a request to begin retrieving and loading the requested content from the mass storage device within the intermediate network device to the memory based on the determination, and queues the packet within the queue;
a packet processing module that, after queuing the packet, processes the packet to assemble a response that includes the content from the memory; and
a memory management module that manages the first and second plurality of cached data objects,
wherein the packet processing module further retrieves the packet and the tag from the queue, accesses an application table stored within the intermediate network device based on the application ID included within the tag to determine whether the requested content has been previously cached to either of the first and the second memories, issues another request to the memory management module of the intermediate network device that causes the memory management module to retrieve one or more of the first plurality of data objects corresponding to the requested content from the memory based on the determination made by the packet processing module, receives the one or more of the first plurality of cached data objects corresponding to the requested content from the memory management module in response to the other request, generates the response that includes the one or more of the first plurality of cached data objects corresponding to the requested content received from the memory management module, and forwards the response to the client device that requested the content.

41. An intermediate network device positioned between a client device of a first network and a remote network device of a second network, the intermediate device comprising:
a memory for caching a first plurality of cached data objects;
a mass storage device for caching a second plurality of cached data objects;
a queue;
a classifier module that receives a packet from the client device of the first network that requests content from the remote network device of the second network, inspects the packet to determine whether the requested content is cached to either the memory or the mass storage device, issues a request to begin retrieving and loading the requested content from the mass storage device within the intermediate network device to the memory based on the determination, and queues the packet within the queue;
a packet processing module that, after queuing the packet, processes the packet to assemble a response that includes the content from the memory; and
a memory management module that manages the first and second plurality of cached data objects,
wherein the packet processing module further issues another request to the memory management module requesting the requested content from the memory, receives, in response to the other request, an indication that the memory management module has not yet retrieved one or more of the second plurality of cached data objects corresponding to the requested content from the mass storage device and loaded the one or more of the second plurality of cached data objects into the memory as one or more of the first plurality of cached data objects, determines a level of congestion of an intermediate network between the first and second network over which network traffic between the first and second network travels in response to the indication that the content has not yet been retrieved, and forwards the packet to the remote network device based on the level of congestion of the intermediate network.

42. The intermediate network device of claim 41, wherein the packet processing module receives a response packet that includes the requested content from the remote network device before receiving the one or more of the first plurality of cached data objects corresponding to the requested content from the memory management module in response to the other request, and forwards the response packet to the client that requested the content.

43. The intermediate network device of claim 41, wherein the packet processing module further:
receives the one or more of the first plurality of cached data objects corresponding to the requested content from the memory management module before receiving a response packet that includes the requested content from the memory management module;
generates the response based on the one or more of the first plurality of cached data objects corresponding to the requested content retrieved by the memory management unit from the memory; and
forwards the response to the client device that requested the content.

44. A network system comprising:
a first network that includes an intermediate network device and at least one client device; and
a second network located remote from the first network and includes a remote network device,
wherein the intermediate network device is positioned between the client device and the remote network device and comprises:
a memory for caching a first plurality of cached data objects;
a mass storage device for caching a second plurality of cached data objects;
a queue;
a classifier module that receives a packet from the client device of the first network that requests content from the remote network device of the second network, inspects the packet to determine whether the requested content is cached to either the memory or the mass storage device, issues a request to begin retrieving and loading the requested content from the mass storage device within the intermediate network device to the memory based on the determination, and queues the packet within the queue;
a packet processing module that, after queuing the packet, processes the packet to assemble a response that includes the content from the memory; and
a memory management module that manages the first and second plurality of cached data objects,
wherein the packet processing module further issues another request to the memory management module requesting the requested content from the memory, receives, in response to the other request, an indication that the memory management module has not yet retrieved one or more of the second plurality of cached data objects corresponding to the requested content from the mass storage device and loaded the one or more of the second plurality of cached data objects into the memory as one or more of the first plurality of cached data objects, determines a level of congestion of an intermediate network between the first and second network over which network traffic between the first and second network travels in response to the indication that the content has not yet been retrieved, and forwards the packet to the remote network device based on the level of congestion of the intermediate network.

45. The network system of claim 44, wherein the packet processing module receives a response packet that includes the requested content from the remote network device before receiving the one or more of the first plurality of cached data objects corresponding to the requested content from the memory management module in response to the other request, and forwards the response packet to the client that requested the content.

46. The network system of claim 44, wherein the packet processing module further receives the one or more of the first plurality of cached data objects corresponding to the requested content from the memory management module before receiving a response packet that includes the requested content from the memory management module, generates the response based on the one or more of the first plurality of cached data objects corresponding to the requested content retrieved by the memory management unit from the memory, and forwards the response to the client device that requested the content.

47. A non-transitory computer-readable storage medium comprising instructions for causing a programmable processor to:
receive, with an intermediate network device, a packet from a client device of a first network that requests content from a remote network device of a second network, wherein the intermediate network device is positioned between the client device and the remote network device;
inspect, with a classifier module of the intermediate network device, the packet to determine whether the requested content is cached by the intermediate network device;
issue, with the classifier module, a request to begin retrieving and loading the requested content from a mass storage device within the intermediate network device to a memory within the intermediate network device based on the determination;
queue, with the classifier module, the packet within a queue of the intermediate network device; and
after queuing the packet, process the packet with a packet processing module of the intermediate network device to assemble a response that includes the content from the memory,
wherein the instructions that cause the processor to process the packet include instructions that cause the processor to:
issue, with a packet processing module of the intermediate network device, another request to a memory management module requesting the requested content from the memory;
receive, in response to the other request, an indication that the memory management module has not yet retrieved one or more cached data objects corresponding to the requested content from the mass storage device and loaded the one or more cached data objects into the memory;
determine, with the packet processing module, a level of congestion of an intermediate network between the first and second network over which network traffic between the first and second network travels in response to the indication that the content has not yet been retrieved; and forward, with the packet processing module, the packet to the remote network device based on the level of congestion of the intermediate network.

48. The computer-readable storage medium of claim 47, wherein the instructions further cause the processor to:

receive a response packet that includes the requested content from the remote network device before receiving the one or more cached data objects corresponding to the requested content from the memory management module in response to the other request; and forward the response packet to the client that requested the content.

49. The computer-readable storage medium of claim 47, wherein the instructions further cause the processor to:

receive the one or more cached data objects corresponding to the requested content from the memory management module before receiving a response packet that includes the requested content from the memory management module;

generate the response based on the one or more cached data objects corresponding to the requested content retrieved by the memory management unit from the memory; and forward the response to the client device that requested the content.

* * * * *

UNITED STATES PATENT AND TRADEMARK OFFICE
CERTIFICATE OF CORRECTION

Page 1 of 1

PATENT NO.        : 7,864,764 B1
APPLICATION NO.   : 12/211371
DATED             : January 4, 2011
INVENTOR(S)       : Qingming Ma et al.

It is certified that error appears in the above-identified patent and that said Letters Patent is hereby corrected as shown below:

In the Claims

Column 31, line 3 (claim 33): delete "of the first plurality of"; line should read -- receive the one or more cached data --

Signed and Sealed this
Seventh Day of October, 2014

Michelle K. Lee
*Deputy Director of the United States Patent and Trademark Office*